US005355443A

United States Patent [19]

Kim et al.

[11] Patent Number: 5,355,443

[45] Date of Patent: Oct. 11, 1994

[54] IMAGE COMPUTING SYSTEM

[75] Inventors: Yongmin Kim; Karl S. Mills; Gillman K. Wong, all of Seattle, Wash.

[73] Assignee: University of Washington, Seattle, Wash.

[21] Appl. No.: 974,681

[22] Filed: Nov. 12, 1992

Related U.S. Application Data

[63] Continuation of Ser. No. 533,122, Jun. 4, 1990, abandoned.

[51] Int. Cl.[5] .......... G06F 3/14

[52] U.S. Cl. .......... 395/131

[58] Field of Search .......... 340/703, 747, 750; 395/100, 131, 164, 165, 166; 358/76, 78, 81, 82, 89; 345/150, 154, 155

[56] References Cited

U.S. PATENT DOCUMENTS

| | | | |
|---|---|---|---|
| 4,297,691 | 10/1981 | Kodama et al. | 340/723 |
| 4,303,986 | 12/1981 | Lans | 364/900 |
| 4,744,046 | 5/1988 | Foster | 364/900 |
| 4,786,893 | 11/1988 | Moore | 340/703 |
| 4,823,120 | 4/1989 | Thompson et al. | 340/703 |
| 4,845,488 | 7/1989 | Kelly | 340/721 |
| 4,908,779 | 3/1990 | Iwata | 364/518 |

OTHER PUBLICATIONS

Richard M. Pier, "An IBM PC/AT-Based Floating Point Imaging Workstation Architecture," Thesis for the University of Washington, May 31, 1988.

A. R. Steiner, "A Versative Biomedical Imaging System for Personal Computers," Electronic Imaging 1987, Anaheim, California, Feb. 19, 1987.

J. W. Chauvin et al., "Graphics and DSP ICs Speed PC Imaging," *ESD: The Electronic System Design Magazine*, Jan. 1987, pp. 49–51.

"Bt463 Product Description," Brooktree Corporation, 9950 Barnes Canyon Road, San Diego, Calif. 92121; 1990.

*Primary Examiner*—Phu K. Nguyen

*Attorney, Agent, or Firm*—Christensen, O'Connor, Johnson & Kindness

[57] ABSTRACT

An image computing system providing at least two display modes and including a set of image coprocessors is disclosed. The system converts image data into signals representing pixel characteristics. The signals can be displayed via a video display device. In a first display mode, pixel characteristic signals are generated for related image planes of a single image by a series of display generating devices and each signal is selected from a separate display generating device. The selected signals are output to a video display device. In a second display mode, pixel characteristic signals for an independent image plane are selected from a single display generating device. The signals are output to a video display device. In this mode, each display generating device converts image data for an independent image plane. In this manner, the system provides single or multiple image display modes. The image coprocessors provide efficient image processing of the image data.

27 Claims, 13 Drawing Sheets

FIG. 3.

| SELECTION | MODE | LUTMODE BITS | LUTS | COMMENTS |
|---|---|---|---|---|
| 1 | TRUE COLOR- NO OVERLAY | F0 | RED = RED ONLY<br>GREEN = GREEN ONLY<br>BLUE = BLUE ONLY | THE RED, GREEN AND BLUE RAMDACS ARE PLACED IN NORMAL MODE, AND THE OVERLAY RAMDAC IS IN X-WINDOWS MODE |
| 2 | ONE OF FOUR IMAGE PLANES- NO OVERLAY | F0 | ALL = ANY | A RAMDAC IS SELECTED FOR DISPLAY BY PLACING THE RAMDAC IN NORMAL MODE, RAMDACS ARE DESELECTED BY PLACING IN X-WINDOWS MODE |
| 3 | TRUE COLOR- 128 COLOR OVERLAY | FF OR FE | RED = RED ONLY<br>GREEN = GREEN ONLY<br>BLUE = BLUE ONLY<br>OVLY = ANY | THE OVERLAY RAMDAC IS PLACED IN NORMAL MODE, AND THE RED, GREEN AND BLUE DACS ARE PLACED IN X-WINDOWS MODE |
| 4 | SINGLE PSEUDO-COLOR-128 COLOR OVERLAY | F1 OR F9 RED<br>F2 OR FA GREEN<br>F4 OR FC BLUE | RED = ANY<br>GREEN = ANY<br>BLUE = ANY<br>OVLY = ANY | THE OVERLAY RAMDAC IS PLACED IN NORMAL MODE, AND THE RED, GREEN AND BLUE DACS ARE PLACED IN X-WINDOWS MODE |
| 5 | REGION OF INTEREST- 16 COLOR OVERLAY USING 3 PLANES | 0F | RED = ANY<br>GREEN = ANY<br>BLUE = ANY<br>OVLY = ANY | ALL RAMDACS ARE PLACED IN NORMAL MODE, UPPER 4 BITS IN OVERLAY PLANE DETERMINE WHICH RAMDAC IS ENABLED |
| 6 | REGION OF INTEREST- 32 COLOR OVERLAY USING 2 PLANES | 1F GREEN/BLUE<br>2F BLUE/RED<br>4F GREEN/RED | RED = ANY<br>GREEN = ANY<br>BLUE = ANY<br>OVLY = ANY | SELECTED RAMDAC PAIR AND OVERLAY RAMDAC ARE PLACED IN NORMAL MODE, UNSELECTED RAMDAC IS PLACED IN X-WINDOWS MODE, 3 BITS IN OVERLAY PLANE DETERMINE WHICH RAMDAC IS ENBLED |

IMAGE COMPUTING SYSTEM

This application is a continuation application based on prior copending application Ser. No. 07/533,122, filed on Jun. 4, 1990 now abandoned.

TECHNICAL AREA OF THE INVENTION

The present invention relates to image processing and graphics systems and, more particularly, to a system that provides true color image displays as well as multiple image pseudocolor displays in conjunction with efficient image processing capabilities.

BACKGROUND OF THE INVENTION

Image computing is a term which consolidates the different disciplines that deal with images. Recent advances in very large scale integration (VLSI) technology, computer architectures, high resolution raster displays, and accurate image digitization devices have stimulated the demand for applications which require advanced image computing capabilities.

Image processing uses various aspects of optics, electronics, mathematics and computer techniques to transform an input image into another image that has desirable properties to the user. This is done by applying some type of transformation to the original image to produce a processed output image. In comparison, image analysis is the process that transforms a digital image into something other than a digital image, such as a set of measurements or objects, or a decision. Image analysis also includes the analysis of scenes or reconstruction of two- or three-dimensional objects from images or a set of projections. Thus, image analysis can be described as a transformation of information from an image space to some type of database for further analysis or processing. The term image processing is loosely used to cover both image processing and analysis.

While image processing is concerned with the analysis, enhancement, or reconstruction of images, the related field of graphics is concerned with synthesis of pictures of real or imaginary objects from a descriptive database. While image processing and graphics both deal with the computer processing of images, they have until recent years been quite separate disciplines.

Both graphics and image processing can be thought of as dealing with static images, which is often an excellent means of communicating information to a user. However, the dynamic variation of images to change the content, format, size, color or orientation is an even better means of communicating information to a user; the user is able to understand data, perceive trends, etc. Thus, interactive image computing, which allows human input to control the processing of images in real time, provides enhanced communication of information to the user. Images, graphics, text, data, and even audio information can be manipulated, integrated and presented by such a system.

An example of a prior art graphics system includes components for converting digital image data to analog display data. Components in such a system include a video frame buffer memory, a lookup table, and a digital-to-analog converter. A digital image is stored in the video frame buffer. Image data from the video frame buffer is input to the lookup table which converts the image data into display data in accordance with the color conversion scheme established in the table. The display data is transformed into an analog signal by the converter. The analog signal is used to drive a video display. Major considerations for such graphics systems are the diversity of color that is available and the number and size of images that can be readily displayed.

With respect to color image generation, a common color graphics system includes a red-green-blue (RGB) digital-to-analog converter (DAC) that has a built-in lookup table. The RGB-DAC generates red, green and blue analog signals on separate channels. The set of signals are used to drive a video display device. It is common to input 8-bits of digital image information into such a system. Thus, 256 ($2^8$) different color output combinations can be selected by the input without changing the lookup table contents. When a single input looks up a set of red, green and blue outputs, the system is referred to as a pseudocolor system. Each output may be a different analog signal level. A special case of pseudocolor models is a grayscale model. For grayscale systems, the red, green and blue outputs are either the same analog signal or are separate outputs having the same level (value).

With the advent of VLSI and dense memory devices, it has become possible to have a graphics system that is capable of generating true color. In a conventional true color system, a series of three single channel-DACs are used. Each DAC is configured to output a single color—the red DAC outputs only red, the green DAC outputs only green, and the blue DAC outputs only blue. Separate components of image data for a single image are input to each DAC. For example, in one such system, 12-bits of input are used; three separate 4-bit image components generate each color, and a total of approximately 4,000 color entries can be selected. This mode can be compared to a 12-bit pseudocolor mode wherein a single input component selects from a set of 4,000 different red, green and blue outputs, but the input signal is not broken up into components that look up separate colors. In this example of a true color system, the single channel outputs from each DAC form a single RGB output set. In order for this system operate in a pseudocolor mode, the same image must be loaded into each DAC. This redundancy in the image frame buffer is not an efficient use of the frame buffer space. One of the drawbacks of such a system is that whether the true color system is operating in true color or pseudocolor mode, the frame buffer includes information related to a single image. The frame buffer includes either related components of a single image or repetitive data describing a single image. Multiple independent images cannot be simultaneously processed by the system.

An image processing system is characterized in part by the method in which it communicates with the main processor and by its processing capabilities measured in terms of speed, capacity, etc. Many image processing systems include one or more coprocessors, which may be connected to their own memory device.

Prior image computing systems have been developed around specialized processors such as the TMS34010 graphics system processor (GSP) and TMS32020 digital signal processor (DSP), both available from Texas Instruments of Dallas, Tex. Drawbacks in such a system include the limited 16-bit fixed-point arithmetic capability of the digital signal processor, which causes accuracy problems in some image processing and graphics operations due to overflow, truncation, etc. The communication between the graphics system processor and the digital signal processor, for example, using first-in first-out (FIFO) buffers, is inefficient and difficult to manage.

The graphics system in this particular example includes a display with a resolution of 512×512 pixels. Additionally, the graphics system includes two lookup tables, and an RGB-DAC using 12-bits of input. An overlay image selected from 128 colors can be displayed using one of the lookup tables. In this particular example, the overlay image is the same as the primary image but is displayed using a different color scheme. This graphics system has certain drawbacks. For example, a screen aspect ratio different than 1:1 (i.e., 512×512 displayed on a rectangular screen requires that images be warped in order for them to appear in proper proportion on the screen. Additionally, for many applications, 512×512 display resolution is inadequate. Finally, only one image is readily displayable at a time.

In an alternative system, the Texas Instruments 74ACT8837 floating-point processor (FPP) replaces the digital signal processor in the system above-described in order to provide high performance floating-point implementation of computationally-intensive image processing and graphics algorithms. However, the graphic capabilities of the system were not modified and did not advance with the processing capabilities.

Fields which rely increasingly on imaging computing techniques include medicine, military, industrial, and scientific applications. A prime example is the medical field. Current needs in the medical field include medical image enhancement, simple measurement or scientific visualization of change, movement, and flow, as well as successive 2-D slices and 3-D medical images. X-ray computed tomography (CT), magnetic resonance imaging (MRI) and positron emission tomography (PET) all use computationally intensive reconstruction methods to produce detailed cross sections of structures. Picture archiving and communications system (PACS) with filmless archiving for a set of images is a powerful concept with vast untapped potential. High performance image computing workstations are essential for continued development in these areas.

SUMMARY OF THE INVENTION

The present invention provides a flexible image computing system whereby a single true color image or multiple independent pseudocolor images are readily selectable for display. The system further provides an image computing subsystem for efficiently manipulating the displayable images.

The image computing system generates output signals that represent picture element (pixel) characteristics. The display portion of the system includes a video buffer, a display mode selection component, and an image conversion component. One or more independent images are stored in the video buffer in the form of image data. The images are stored in a plurality of image planes. The display mode selection component selects a display mode from at least two display modes. The first display mode is a true color mode and the second display mode is a pseudocolor mode. The image conversion component produces pixel characteristic signals from the stored image data in accordance with the display mode selection.

The image conversion component includes a number of display generating devices and a display logic device. Each display generating device converts image data from one of the image planes into pixel characteristic signals. Each of the display generating devices can generate one or more pixel characteristic signals. The display logic device controls signal output from the display generating devices in accordance with the display mode selection. If the selected display mode is the true color mode, then each pixel characteristic signal is output from a separate display generating device. For example, a red signal is produced from one display generating device, a green signal is produced from another display generating device, etc. The set of signals are output to a video display. If the selected display mode is the pseudocolor mode, then a set of pixel characteristic signals are output from a single display generating device. The signals are again output to a video display.

The present invention thus provides a system architecture for generating a true color image or multiple independent pseudocolor images. These images are generated and are available for immediate display without requiring that the image data in the video buffer be altered. Prior true color systems can generally display pseudocolor images by loading the same image plane into the red, green and blue video buffer planes and inputting the image data into each display generating device. The present invention provides the same result by loading an image into a single image plane and inputting the image data into a single display generating device. Thus, data redundancy in the video buffer is unnecessary.

In accordance with other aspects of the present invention, each of the display generating devices includes a lookup table including pixel characteristic entries that are addressed by the image data. The image data is converted into the pixel characteristic entry that is stored at the table address associated with the image data. The lookup table contents in part determine whether a particular display generating device outputs a single pixel characteristic signal or a set of pixel characteristic signals.

In accordance with further aspects of the present invention, the set of pixel characteristic signals includes three color signals. Each display generating device corresponds to one of the colors. The lookup tables include subentries; each subentry corresponds to a color. In the first display mode, the image data includes three related components, each corresponding to one of the colors and each stored in a separate image plane. Each color component is input to the display generating device related to that color. Each display generating device outputs the corresponding color signal. Each display generating device lookup table includes subentries only for that device's color and null subentries for the remaining colors. For example, the color signals may be red, green and blue signals. The red display generating device thus receives the red data component and outputs a red signal. In the second display mode, image data is input into a single display generating device. The display generating device lookup table includes subentries for each color signal. The device outputs each of the three color signals.

In accordance with additional aspects of the present invention, each of the display generating devices converts image data for an independent image into a set of pixel characteristic signals. The independent image is stored in an independent image plane. The mode selection further includes a region of interest mode in conjunction with the second display mode. In this mode, an image plane selection is made for each pixel. When the system operates in this mode, the display logic selects pixel characteristic signals for each pixel from a single display generating device in accordance with the image plane selection for that pixel. In one embodiment, the display logic selects the signal output for each pixel in accordance with control information in one of the images.

In accordance with still other aspects of the present invention, the system operates in an overlay mode in conjunction with the first or second display modes. The overlay mode can be selected, via the display mode selection component, in conjunction with any of the other modes. In one embodiment, the display logic selects the signal output for each pixel in accordance with control information in one of the images.

In accordance with still further aspects of the present invention, the image computing system includes a set of image coprocessors, each including a processor and memory. The coprocessors efficiently perform image processing and graphics functions. The image data is passed between the coprocessors and the video buffer so that image processing functions can be performed on the image data and the processed image data subsequently output for display. For graphics, an image database can be sent to the coprocessors, a graphics scene generated or rendered, and the resultant image data passed back to the video buffer for display.

In accordance with other aspects of the present invention, the image computing system is integrated into a host computer system. The image computing system includes a host system interface for communicating with a host system as part of a central graphics system processor and memory. The graphics system processor includes a main control program for controlling the communication between the host system and the image computing system via the host system interface. In this configuration, image data is transferred from the host to the video buffer, and display mode and processing commands are received from the host.

In one embodiment, the invention includes a video frame buffer memory for storing image data, region of interest and overlay logic for display mode selection, and a series of random access memory digital-to-analog converters (RAMDACs) for converting the image data into pixel characteristic signals. Each RAMDAC device includes a lookup table and operates in two modes. Each of the RAMDACs can output red, green, and blue pixel characteristic signals either one channel at a time or simultaneously. For true color displays, related color components of a single image are input to each RAMDAC and each RAMDAC outputs a different color channel signal. The set of signals are sent to a video display device. For pseudocolor image generation, image data for an independent image is input to a single RAMDAC. The RAMDAC is then enabled to output pixel characteristic signals on each of its channels simultaneously. By enabling different RAMDACs, multiple different images can be readily displayed. The number of images available corresponds in part to the number of RAMDACs in the system. The display mode selection is controlled in part by control signals generated from a logical combination of control signals and image data. The selection is further controlled by RAMDAC mode selection.

BRIEF DESCRIPTION OF THE DRAWINGS

The foregoing abstracts and the attendant advantages of this invention will become more readily appreciated and the same become better understood by reference to the following detailed description, when taken in conjunction with the accompanying drawings, wherein:

FIG. 3 is a tabular depiction of a variety of display modes and the related display selection logic in accordance with the present invention;

DETAILED DESCRIPTION OF THE PREFERRED EMBODIMENT

The present invention provides a system whereby a single plane of true color images or multiple planes of pseudocolor images are readily selectable for display. Generally, a plane itself may include multiple images. For clarity of description, unless otherwise indicated, it is assumed for discussion that a single image is held in each plane. Thus, for example, references to independent images are references to independent planes.

Figure 1:
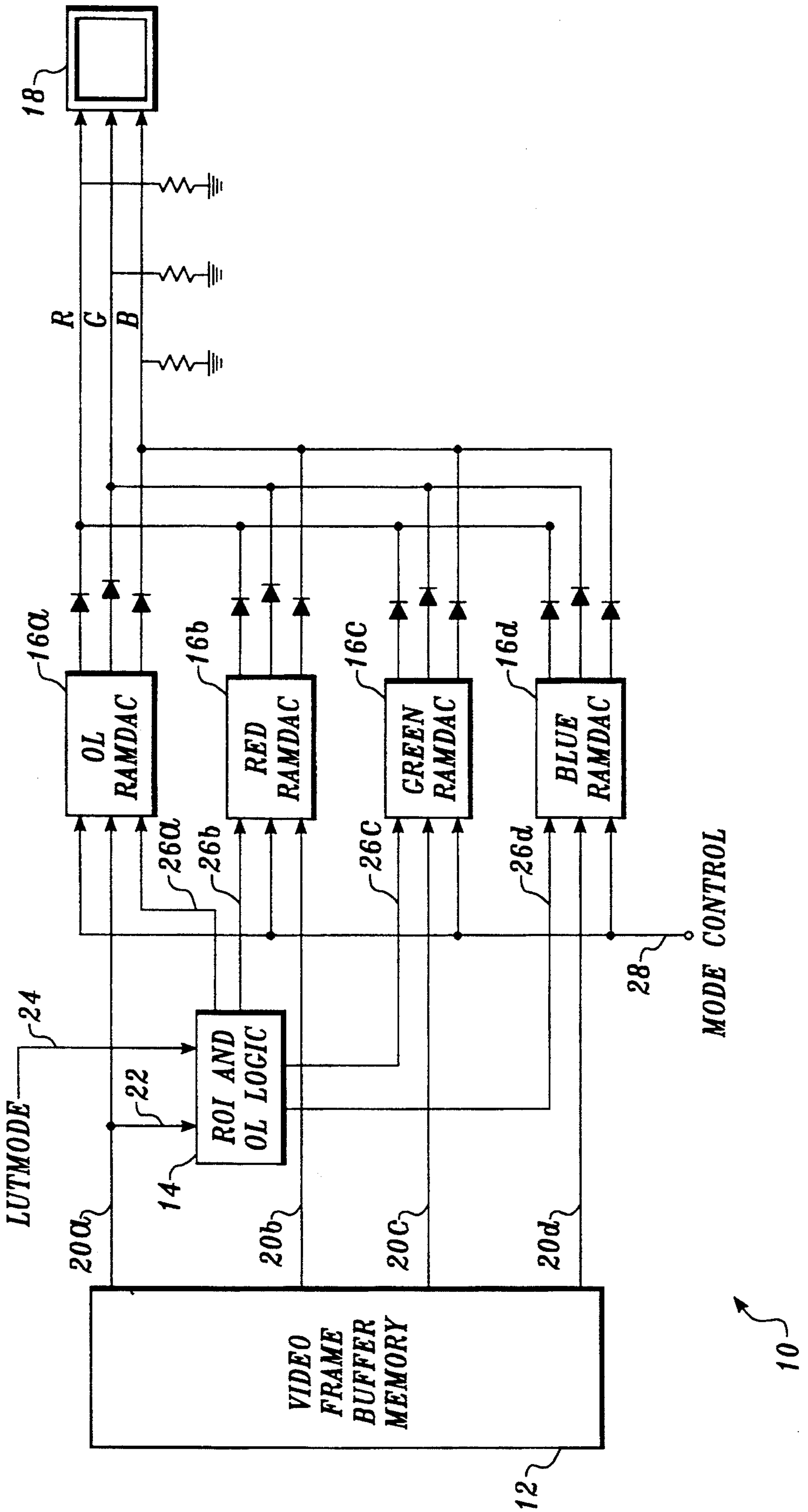
FIG. 1 is a schematic diagram of a graphics subsystem in accordance with the present invention.

With reference to FIG. 1, a preferred embodiment of a display subsystem 10 in accordance with the present invention on includes a video frame buffer memory 12, region of interest (ROI) and overlay (OL) logic 14, a series of random access memory digital-to-analog converters (RAMDAC) 16 (*a–d*), and a high resolution video monitor 18.

In one actual embodiment, the system provides 16 Mbytes of image storage in the video frame buffer and supports both 8-bit pseudocolor images and 24-bit true color images. Eight-bits of overlay is available in each mode. Eight-bits of image data is transferred on lines 20(*b–d*) to the RAMDACs 16(*b–d*). Eight-bits of overlay data is transferred on line 20*a* to the overlay RAMDAC 16*a*. Thus, each RAMDAC receives 8-bits of input. Four-bits of logic data (referred to as the "logic nibble"), which is the uppermost 4-bits of the overlay data, is transferred along line 22 from line 20*a* to the ROI and OL logic 14.

An 8-bit lookup table mode (LUTMODE) signal from a control processor (not shown) is transferred to the ROI/OL logic along line 24. The LUTMODE signal and logic nibble are processed by the ROI/OL logic; the 4-bit result is used as part of the RAMDAC selection control. The result is output on lines 26(*a–d*) to the RAMDACs. Finally, RAMDAC mode selection commands are received along line 28 from a control processor (not shown). The ROI/OL logic output and the RAMDACs' mode selections control the output to the video monitor. Control of the LUTMODE signal and the RAMDAC modes is combined with the RAMDACs' LUT entries to provide the desired video display. Each RAMDAC outputs three channels of analog signals. The signals are referred to as pixel characteristic signals. These signals form a set of signals that can drive a video display device.

By enabling different combinations of the RAMDACs' output, the subsystem can generate a very rich color image display or can generate several independent color images that a user can readily select for immediate display. Thus, the display subsystem architecture is an integral part of a highly flexible display generating system. The video signal generated by the graphic subsystem is characterized as (1) true color with or without overlay; (2) pseudocolor or (3) pseudocolor with overlay and/or region of interest.

True color in this context refers a mode in which an image including over 16 million colors can be generated. The colors are selected by the 24-bit input from the video frame buffer to three of the RAMDACs; each of the RAMDACs receives a separate 8-bit component of the 24-bit input. Each RAMDAC outputs a single color signal. In pseudocolor mode, an image is generated from an 8-bit input from the video frame buffer to a single RAMDAC. The 8-bit input represents an independent 8-bit image. The RAMDAC outputs color signals on each of its channels. This latter display mode includes a single image display, multiple image displays, and single or multiple simultaneous image displays with overlay. Thus, the display subsystem provides display options previously provided by a number of disparate architectures.

Digital image data contained in the video frame buffer 12 memory is converted to video display data via the RAMDACs. In one actual embodiment, four Bt460 (or Bt459) RAMDACs, available from the Brooktree Corporation, San Diego, Calif., are used to drive the video monitor. The RAMDACs combine the function of triple VIDEODACs, color palette RAMs, pixel input multiplexers, hardware cursor, 1–16 integer zoom, and multiplexed pixel panning. These particular RAMDACs have two programmable display modes; the two RAMDAC modes are referred to as Normal and X-Windows mode (discussed below). A detailed description of the RAMDAC's architecture appears in "Brooktree Product Data Book" Ed. 2 (1989).

Each RAMDAC includes a built-in 512×24-bit lookup table (LUT) having two operating modes. Essentially, the table is treated as two 256×24-bit tables: a primary and an alternative table. Unless otherwise indicated, references will be to the primary LUT. The lookup table entries are 24-bits of color information that includes subentries of 8-bits of red, 8-bits of blue, and 8-bits of green. A LUT entry is addressed by an 8-bit input from the video frame buffer. Thus, an 8-bit input looks up 8-bits each of red, green and blue. This is referred to as an 8-to-24-bit lookup table. The RAMDAC converts each 8-bit digital output into an analog output signal; each 8-bits of color output drives a signal on the corresponding output channel.

Several lookup table entries are shown in Table 1. Note, these entries are not related to each other and would not generally appear in a single lookup table at the same time since they represent lookup table configurations for different display modes. In entries 1 and 2, pseudocolor LUT entries are illustrated. Each 8-bit input looks up 8-bit subentries of red, green and blue. Each red, green and blue subentry can be a different value. In the special pseudocolor mode of grayscale, the red, green and blue subentries are equal. Entries 3 and 4 illustrate this special case. Grayscale is generally used when a black and white monitor is used, or when contrast in an image is more important than color. For example, in medical applications, (e.g., x-ray imaging), grayscale images are generally preferable.

In entries *5a*–*5c*, the input represents the input color components of a 24-bit image. Each component separately looks up a single color. For example, entry *5a* is the red component of an image. The input looks up a red subentry and no green or blue subentry. To obtain only red output, the green and blue portions of the lookup table (16-bits) are loaded with zeros, which convert to black analog signals. The 8-bit input looks up 8-bits of red and 16-bits of black. Thus, this RAMDAC output will only provide red signals on the red channel to drive the video monitor. The blue and green outputs will not affect any nonzero output from other RAMDACs.

TABLE 1

| | | Output | | |
|---|---|---|---|---|
| | Input | Red | Green | Blue |
| 1. | 00000001 | 00000100 | 10001000 | 00001000 |
| 2. | 00001010 | 00001111 | 00001100 | 11000010 |
| 3. | 11100011 | 00001110 | 00001110 | 00001110 |
| 4. | 00001000 | 00100001 | 00100001 | 00100001 |
| 5a. | 00010001 | 11100000 | 00000000 | 00000000 |
| 5b. | 00100001 | 00000000 | 01111111 | 00000000 |
| 5c. | 00001111 | 00000000 | 00000000 | 11001100 |

The color channel outputs from each RAMDAC are summed together (e.g., all reds summed, all blues summed, and all greens summed) and the composite signals are used to drive the video monitor. The RAMDAC outputs are current outputs, which can be directly wire-ORed together. However, the parasitic capacitance of the current outputs for the three inactive RAMDACs at any one time would cause a noticeable reduction in the slew rate of the active RAMDAC's output. Thus, image quality would significantly degrade. To alleviate this problem, very high switching speed and low capacitance diodes are placed on all current outputs from the RAMDACs. Each of the RGB outputs are then wire-ORed together. This wire connection method allows the multiple outputs from the color channels to be combined. The final red, green and blue channels are each terminated with a 75 ohm resistor. In addition to the RGB outputs, horizontal sync and vertical sync outputs (not shown) are provided to drive the high resolution display monitor. The horizontal and vertical sync signals are generated directly by a central processor.

The video frame buffer memory 12 is constructed from 16 Mbytes of video RAM (VRAM). In one mode, the video frame buffer is configured as a single 2K×2K×32-bit frame buffer. The 2K×2K dimension is related to the x-y dimension of an image. The 32-bit dimension relates to a pixel characteristic description such as hue, intensity, saturation, or a combination thereof. When the frame buffer is treated as a 32-bit deep linear address space representing a 2K×2K×32-bit image frame, the frame buffer holds a single 24-bit digital image with an optional 8-bit overlay image. True color displays with or without overlay are generated in this mode. Alternatively, the video frame buffer is configured as four 2K×2K×8-bit frames buffers. The data in each frame buffer is referred to as an "image plane" or simply as a "plane". In this mode, four independent 8-bit images can be processed and selected for display. The display may include one of the images or a combination of separate regions of multiple images. Alternative video frame buffer configurations are four of 4K×2K×4-bit, 8K×2K×2-bit, and 16K×2K×1-bit frames. These latter configurations (not shown) are used with applications that manipulate 4, 2, and 1-bit image representations. As noted above, each plane in such a large frame buffer will generally include a set of images. In use, a user may roam a plane in the frame buffer in order to view each of the images stored therein. The entire plane is referred to in this discussion as an independent image.

The large video frame buffer provides the ability to load large images into the buffer and roam through them, or to load several different images (e.g., an entire CT or MR study) into the buffer at once. In one actual embodiment, the video monitor 18 is 1280×1024 pixels. Thus, the video frame buffer is more than two times the monitor height and width. For computer graphics or computer animation applications, a video frame buffer of more than two times the monitor size allows double buffering of the display for smooth image and graphics transitions. The size of the video frame buffer is also part of the solution for problems related to resolution and aspect ratio. The aspect ratio is nearly 1:1 in all display modes, e.g., 1280×1024 pixels are output to the 4:3 aspect ratio rectangular video monitor. This provides a proportionally correct image as is required for most graphics and image processing applications. The display resolution of 1280×1024 pixels is sufficient for most applications, while a roamable frame buffer of 2K×2K provides an acceptable solution for other applications.

Figure 2A:
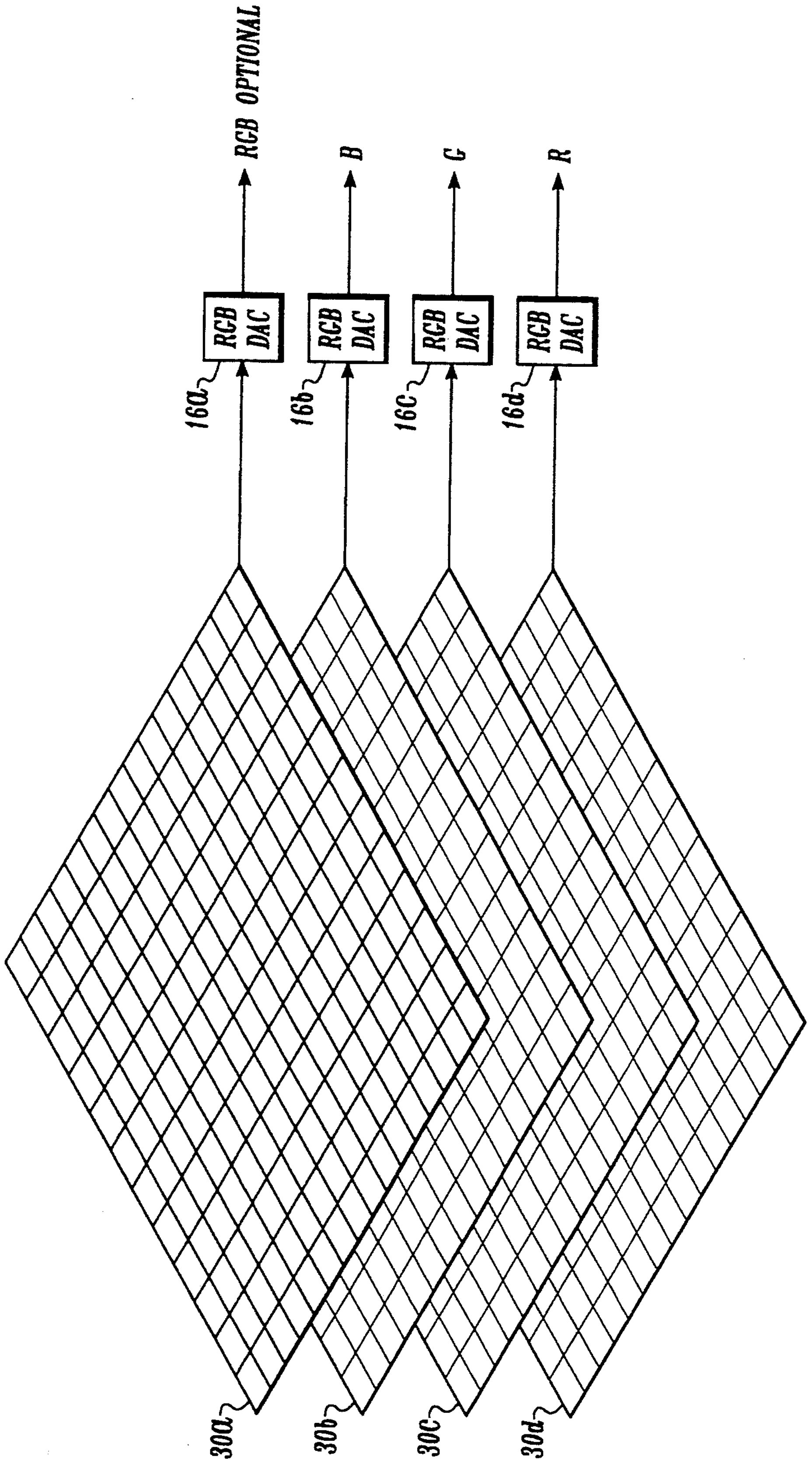
FIG. 2A–D are pictorial diagrams of a variety of display modes provided by a system in accordance with the present invention.

Examples of several display modes, in conjunction with particular image plane contents, are shown in FIGS. 2A–D. With reference to FIG. 2A, for a true color display, each pixel in the 2K×2K frame buffer includes 24-bits of image data (8-bits for each of three colors) and 8-bits for overlay. The overlay, blue, green and red frame buffer inputs are depicted as image planes 30(*a–d*), respectively. A single 24-bit digital image from planes 30(*b–d*) *is output into the color RAMDACs and* 8-bits of overlay are output into the overlay RAMDAC. Each RAMDAC receives input for one color component (RGB) or for overlay. Each of the three color RAMDACs **16*b–d*) drives a separate color signal. The overlay RAMDAC 16*a*** optionally provides overlay information.

Figure 2B:
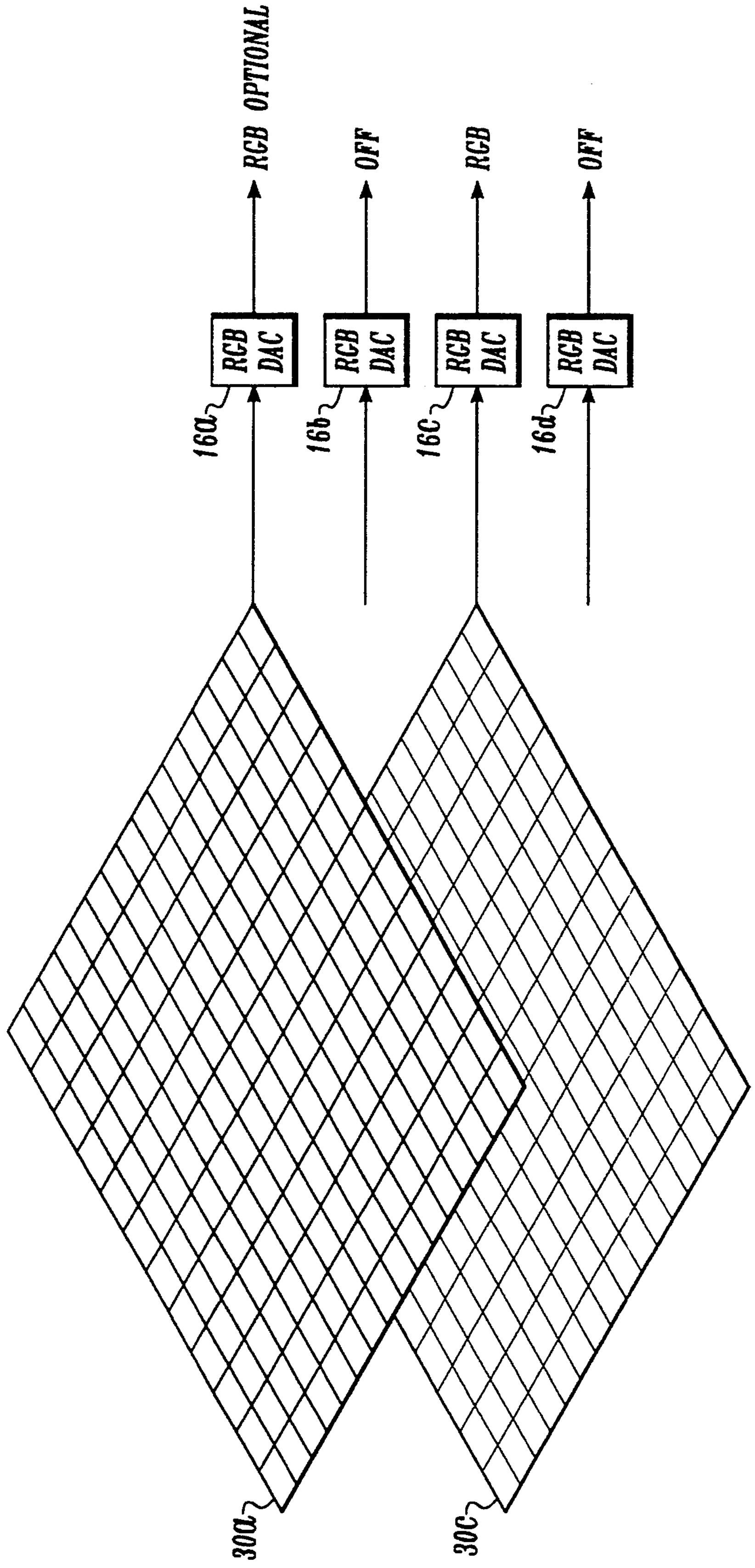

With reference to FIG. 2B, for pseudocolor applications, each RAMDAC receives image input from a separate 8-bit plane (e.g. green plane **30*c*); a single RAMDAC (e.g. green RAMDAC 16*c*) is enabled to drive red, green and blue (RGB) outputs concurrently while the other RAMDACs are disabled (OFF). An overlay is optionally provided from overlay RAMDAC 16*a***. Alternatively, the overlay plane includes a fourth selectable image.

Figure 2C:
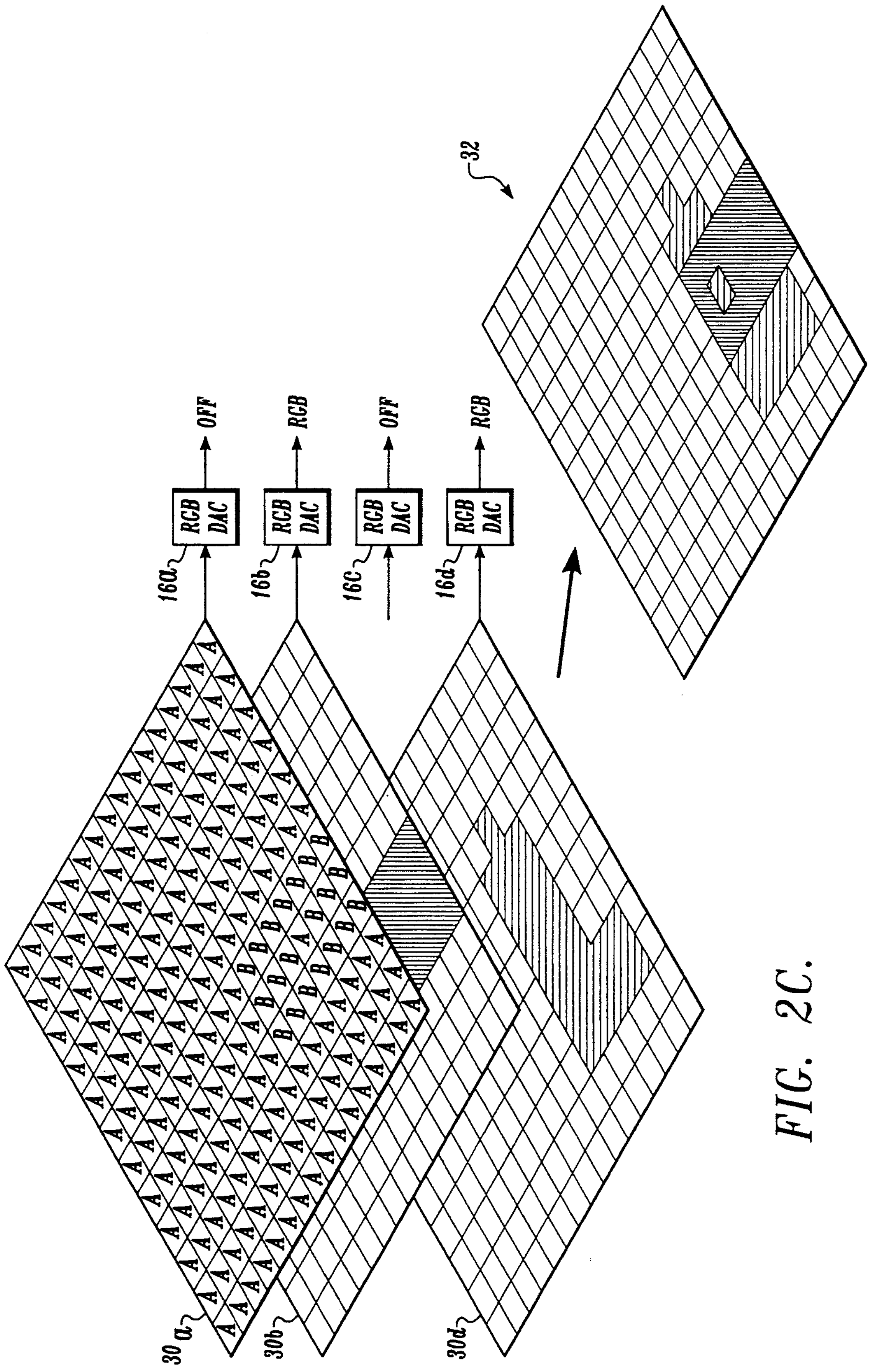

With reference to FIG. 2C, pseudocolor applications can also utilize region of interest (ROI) logic to enable/disable the display of images from different RAMDACs on a pixel-by-pixel basis. The RAMDAC output selection is coded in the logic nibble of the overlay plane **30*a*. The logic nibble is processed by the ROI/OL logic to determine which RAMDAC is to be enabled. The display result 32 includes portions of planes 30*b* and 30*d***.

Figure 2D:
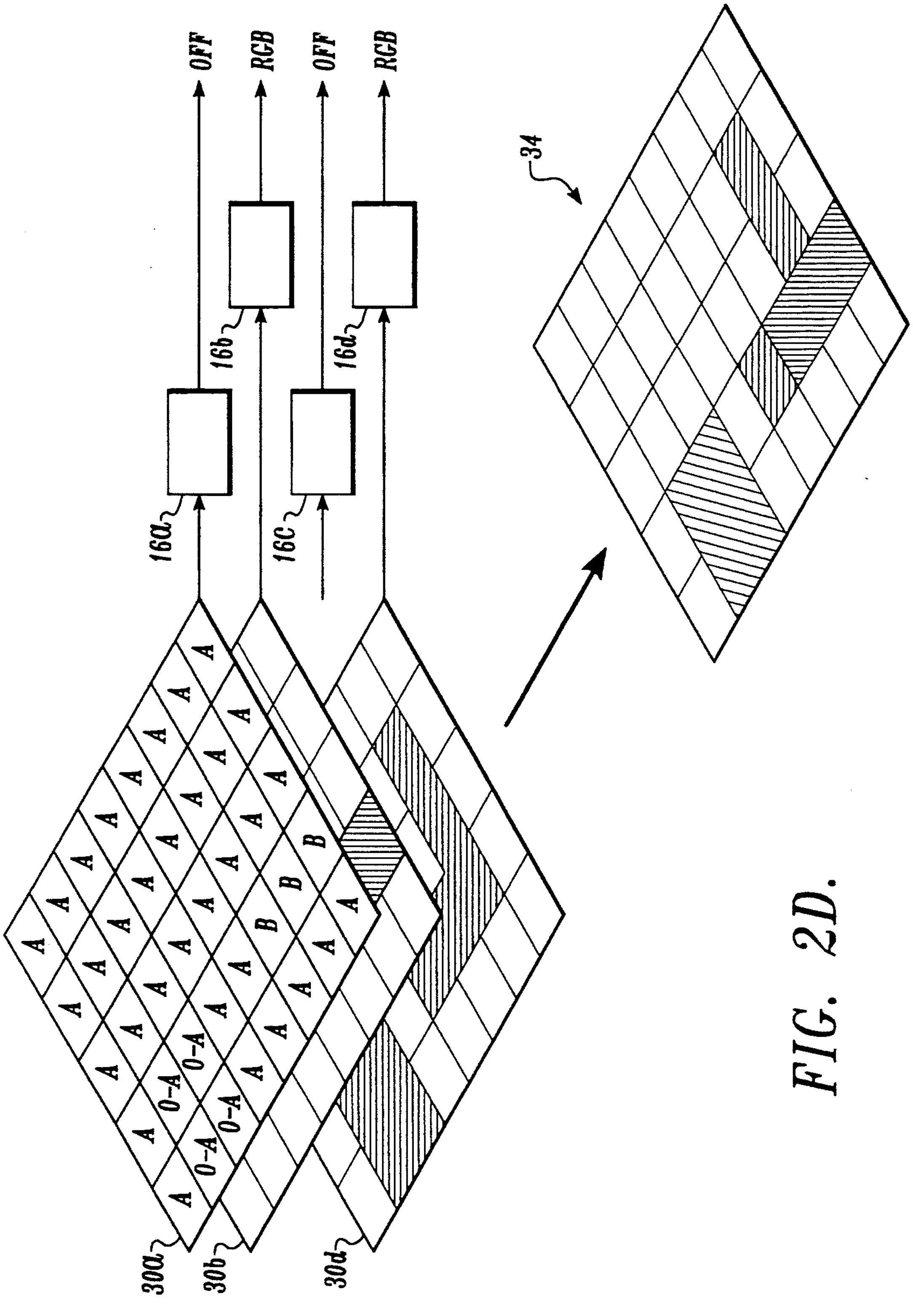

With reference to FIG. 2D, pseudocolor applications can also utilize overlay logic to select image or overlay output on a pixel-by-pixel basis. As illustrated in FIG. 2C, data in the overlay plane identifies the RAMDAC output enablement; in this case, an image from plane **30*b* or 30*d*, or output from overlay plane 30*a*, which is overlay O information, is output. The display result 34** includes information from three planes.

The control configuration for the display selections are illustrated in the mode selection table of FIG. 3. The mode selection table includes a description of the mode, the LUTMODE control signal setting, the lookup table content, and the RAMDAC mode setting and enablement logic. With respect to the LUTMODE control signal, the binary coded hexadecimal value of the 8-bit signal is listed. This signal is used by the ROI/OL logic to determine which of the RAMDACs receives an enabling signal generated from the logic nibble. With respect to the lookup table contents, this column indicates the values that the RAMDAC LUTs must contain for each display mode. For example, for true color, the red RAMDAC must have the red portion of its LUT loaded with red information, while the remaining green and blue portions are loaded with black. This instruction appears in the column as red only. The any indication in this column indicates that the RAMDAC LUT can be loaded with any conversion table, e.g., single color, pseudocolor, or grayscale tables.

If overlay is not required, displays are generated in accordance with Selections 1 and 2. For true color without overlay, in Selection 1, the red, green and blue RAMDACs are simultaneously placed in Normal Mode. The LUTs are written such that all LUT entries are black except the red portion of the red RAMDAC LUT, the green portion of the green RAMDAC LUT, and the blue portion of the blue RAMDAC LUT. In this mode, the overlay RAMDAC is disabled by placing it in the X-Windows mode. This mode is illustrated in FIG. 2A in the instance in which the overlay RAMDAC is OFF.

Eight-bit pseudocolor images are displayed without an overlay in accordance with Selection 2. Each RAMDAC, including the overlay RAMDAC, can be loaded with an 8-bit image from one of the four planes. Therefore, the display can be selected from four separate images by enabling the appropriate RAMDAC. The selected RAMDAC is enabled by placing it in Normal mode; the other RAMDACs are simultaneously disabled by placing them in X-Windows mode. As an example of use of this mode, four related images may be stored in the four frame buffers. One image at a time can be displayed. This mode is illustrated in FIG. 2B in the instance in which the overlay RAMDAC is in RGB mode. This display mode provides a great advantage over prior graphics systems. In particular, four images are immediately displayable. In many prior systems, only a single image is loaded into the video frame buffer and is available for display. In such systems, in order to display another image, the video frame buffer must be rewritten.

Overlay is available in all of the modes, with the exception of Selection 2. In Selections 3–6, the overlay RAMDAC generates overlay (or region of interest selection) leaving the three color RAMDACs to generate the image display.

True color with overlay is described in Selection 3. The color RAMDACs are set in X-Windows mode and the overlay RAMDAC is set in Normal mode. The uppermost bit from the logic nibble is used to control enablement of either the overlay RAMDAC or the color RAMDACs. If, for a particular pixel, the uppermost bit of the logic nibble=1, then that pixel is an overlay pixel; the remaining 7-bits in the overlay plane look up the output. Thus, the overlay may be any one of 128 colors or brightness levels. The uppermost bit setting is processed by the ROI/OL logic and causes the color RAMDACs to be disabled. If, for a particular pixel, the uppermost bit of the logic nibble=0, then all the remaining bits in the overlay plane for that pixel are also set=0. This ensures that the overlay RAMDAC does not output a pixel value. The color RAMDACs are enabled via the ROI/OL logic output in accordance with the uppermost bit's setting. This mode is illustrated in FIG. 2A in the instance in which the overlay RAMDAC output can be toggled on and off.

Selection 4 is similar to Selection 2 except that only one of three images can be displayed and there is the option to provide an overlay. The LUTMODE signal controls the enablement of one of the color RAMDACs. In this pseudocolor overlay mode, as in the true color overlay mode (Selection 3), the uppermost bit of the logic nibble is used to select either the overlay plane (uppermost bit=1) or the enabled color RAMDAC (uppermost bit=0). The value in the least significant 7-bits of the overlay plane is used to look up an entry in the overlay RAMDACs LUT if the overlay is enabled. This mode is illustrated in FIG. 2B in the instance in which overlay is available.

One of the most powerful modes available is the region of interest (ROI) mode, described in Selections 5 and 6. The region of interest mode selects output on a pixel-by-pixel basis. In Selection 5, any one of the RAMDACs can be enabled and the output sent to the screen on a pixel-by-pixel basis. All of the RAMDACs are set in Normal mode, and the logic nibble controls the RAMDAC output enablement via the ROI/OL logic. The logic nibble bits xxxx represent the overlay/blue/green/red RAMDACs. As in the overlay mode of Selection 3, the uppermost bit is used to enable the overlay RAMDAC. If, for a particular pixel, the uppermost bit=1, then the overlay RAMDAC is enabled and the least significant nibble of the overlay plane looks up the output. Thus, the overlay output is limited to sixteen possible outputs. The remainder of the logic nibble indicates which color RAMDAC is enabled if the overlay RAMDAC is not enabled. For example, if the nibble is 0010, the green RAMDAC is enabled.

The mode described in Selection 6 is similar to that described in Selection 4, except that there are 32 overlay color options and two planes from which the image can be selected. In this mode, the LUTMODE signal selects a color RAMDAC to be disabled. The uppermost nibble xxxx of the signal represents the overlay/blue/green/red RAMDACs. The binary representation of the uppermost nibble of the signal identifies the selected RAMDAC pair: 0001 for the green/blue pair; 0010 for the blue/red pair; and 0100 for the green/red pair. The uppermost bit of the logic nibble again indicates whether the overlay RAMDAC is enabled or disabled.

When the overlay RAMDAC is disabled, two of the remaining 3-bits in the nibble are used to select the RAMDAC output from the plane pair. This is the same logic that is used in Selection 5. For example, if the green/blue RAMDACs are selected by the LUTMODE signal, then the two middle bits (blue and green) of the upper nibble select which RAMDAC (blue or green) will output to the display. As a specific example, if the upper nibble is 0100, the blue RAMDAC is enabled.

When output from the overlay RAMDAC is enabled, 5-bits of input from the overlay plane select the output. The remaining bit in the upper nibble, in this example the least significant bit (red), is combined with the lower nibble of the overlay plane to select output from the overlay RAMDAC LUT. For example, if the upper nibble of the LUTMODE signal is 0010, the green RAMDAC is disabled. If the overlay plane input is 10x0xxxx, the uppermost 1 indicates that overlay is to be output; the 5-bit string, xxxxx, is then used to lookup the overlay output value. The x entry indicates that the value in that place may be a zero or a one. This display mode is illustrated in FIG. 2D.

Using the various combinations of LUTMODE control signals, RAMDAC mode selections, and overlay frame buffer data, a broad range of display options are provided by the system. As can be seen, the ROI/OL logic combines the LUTMODE control signal and the logic nibble to produce control information for the RAMDACs. This system relies in part on the selection/deselection capabilities that are built into the RAMDACs. Additionally, the system utilizes the RAMDAC's built-in overlay capability in order to disable a RAMDAC via the ROI/OL logic. When a RAMDAC is in X-Windows mode, the RAMDAC can be controlled to use the normal LUT or an overlay LUT. If the RAMDAC is to be disabled, the ROI/OL logic causes the RAMDAC to utilize its overlay LUT, which has been written to black. In a system that provides true color and pseudocolor, this unconventional use of the overlay LUTs allows for easier control of the RAMDAC output than by conventional methods. Using the overlay RAMDAC also provides broader overlay capabilities than are available by using the RAMDACs' built-in overlay capabilities.

While the hardware selection of the display modes has been described, software control of the selections are provided to application programmers for ease of use. For example, a dacsel function can be written in C language to allow a user to select different combinations of the four RAMDACs/planes to be enabled. The configurations are: red only; green only; blue only; overlay only; red, green and blue; and ROI. In response to a user selected configuration, the system sets the RAMDAC modes, LUTMODE control signal, and logic nibble in accordance with the information listed in FIG. 3.

Figure 4:
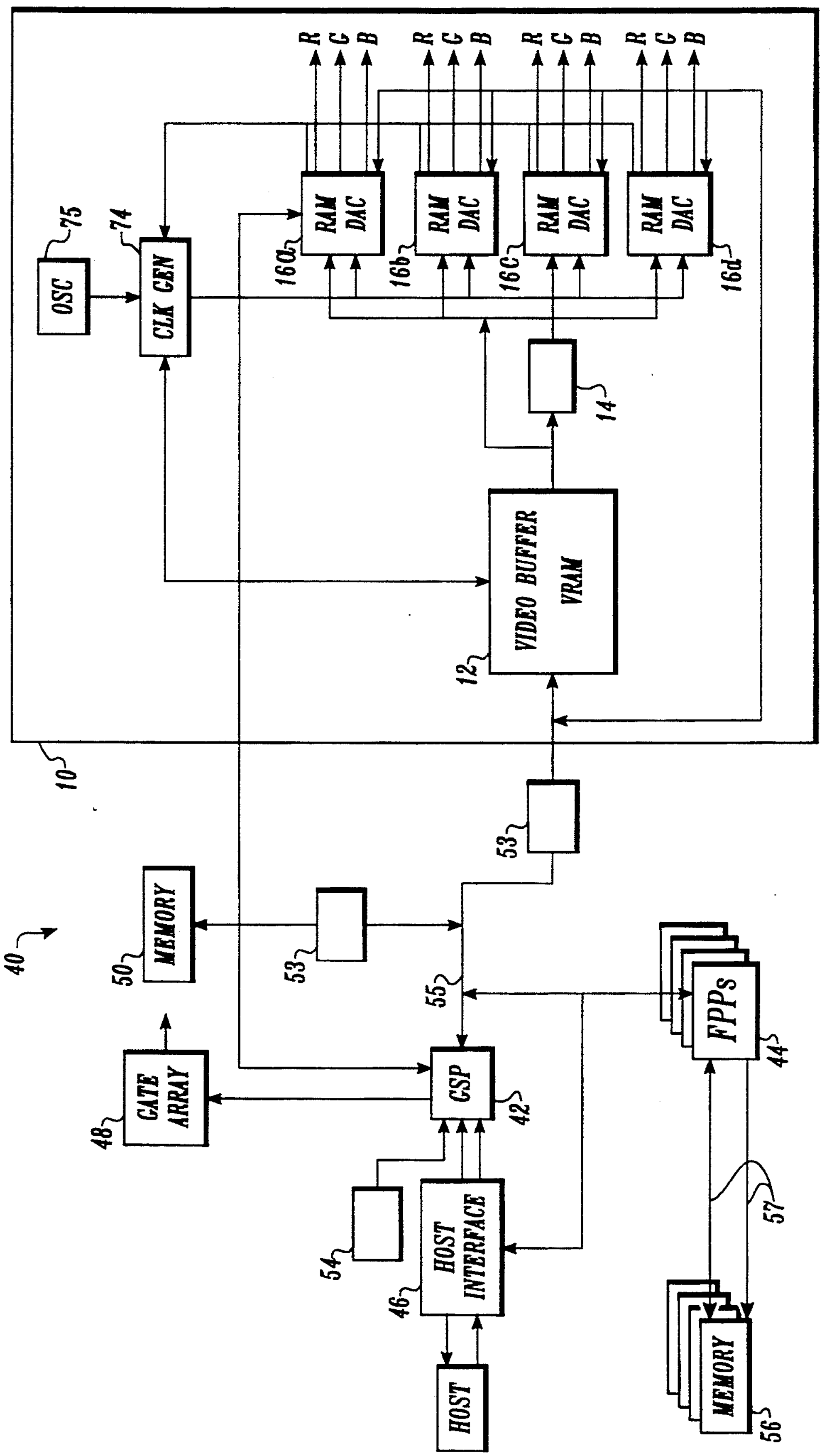
FIG. 4 is a block diagram of an image processing and graphics system in accordance with the present invention.

With reference to FIG. 4, in one actual embodiment, the display subsystem 10 is integrated into an image computing system 40. The components of the system include a graphics system processor 42, a series of floating-point processors 44, a host interface 46, a gate array 48, program and data memory 50, and the display subsystem 10. In one actual embodiment, the entire system, with the exception of the coprocessors, is implemented on a single multilayer circuit board. The board includes an expansion connector for a coprocessor board including the coprocessors.

In one actual embodiment, the image computing system is designed around two special purpose very large scale integration (VLSI) processors-the Texas Instruments TMS34020 graphic system processor (GSP) and the TMS34082 floating-point processor (FPP). The Texas Instrument processors and their operations are discussed fully in "TMS34020 User's Guide" (1990), "TMS34082 Floating-Point Processor User's Guide" (1990), "TMS340 C Complier User's Guide" (1990), "TMS340 Assembly Language Tools User's Guide" (1990), and "TMS340 Math/Graphics Functions Library User's Guide" (1987).

The TMS34020 GSP is the second generation of an advanced high-performance CMOS 32-bit microprocessor optimized for graphics display systems. The GSP generates video timing and control signals. The horizontal and vertical blank and sync signals generated by the GSP are sent to the RAMDACs, the gate array, and the video memory as necessary to generate the video display. This particular GSP contains the hardware necessary to control the system's memory devices; the memory interface requires only the addition of buffers 52, transceivers 53 and minimal control logic. Additionally, an oscillator 54 drives the system clocks in the GSP.

In one actual embodiment, four floating-point processors are connected to the local address and data (LAD) bus 55 to provide additional computational capability. The TMS34082 FPP is a high-speed (40 MFLOPS peak)processor, which includes a sequencer, address generation, and a three operand floating-point unit with twenty-two 64-bit data registers. Each FPP is connected to its own bank of high speed 16K×32-bit static memory 56 via the FPP data and address buses 57. The static memory is for external microcode and data storage. The buses between static memory and the FPP operate independently from the GSP's local address and data bus, thus reducing LAD bus activity. Transfers between the GSP memory and the FPP static memory pass through the FPP via the local address and data bus and FPP buses when data or programs are needed by the coprocessors.

The host interface 46 provides the interface between a host system and the image computing system. The graphics and image processing duties are removed from the host system thereby allowing the host to carry out other processes simultaneously. An example of a host system is the NeXT computer available from NEXT, Inc., Redwood City, Calif. In the NeXT computer, the image computing system 40 is established in one of the computer's three expansion slots. The host initializes the image computing system by transferring an executable command decoder into the program memory 50 via the host interface 46. With the command decoder installed, graphics and image processing commands are issued from the host and processed by the image computing system. The host is then free to pursue other functions while the command is decoded and executed. Host command and data buffers in the host interface are used to pass command tokens and data between the host and the image computing system. The host command buffer is also used for handshaking when the image computing system is operating. A detailed description of the NeXT computer is available in the "NEXT User's Guide," Vols. 1,2, and 3 (1990).

Figure 5:
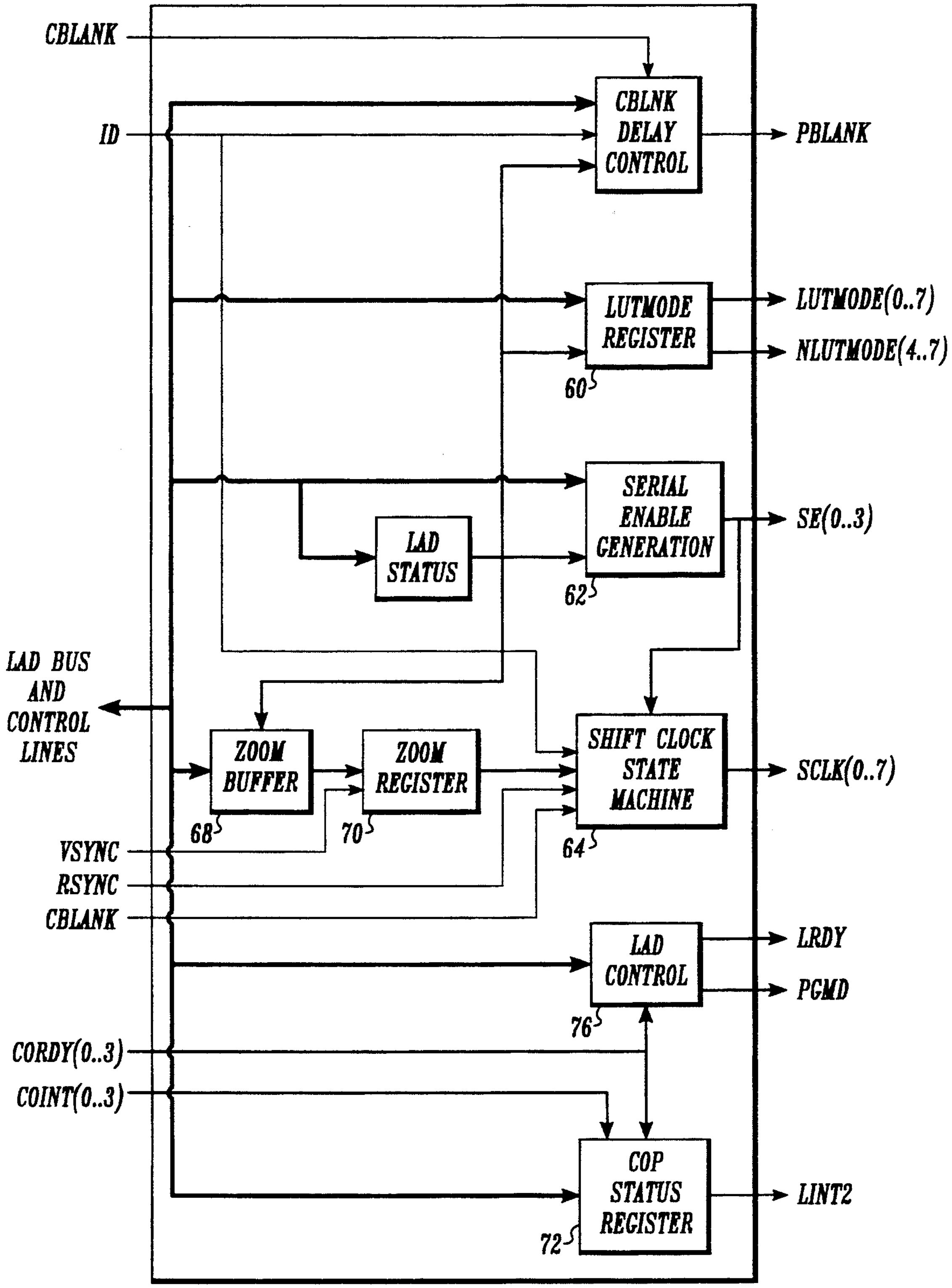
FIG. 5 is a block diagram of a programmable gate array used in the system illustrated in FIG. 4.

The control signals and registers necessary to tie the modules of the system together are provided by a programmable gate array 48. In one actual embodiment, the gate array is the Xilinx logic cell array (LCA) XC3042, available from Xilinx, Inc., San Jose, Calif. The operation of the component is discussed in detail in "The Gate Array Data Book" (1988). In this particular embodiment, a programmable gate array is used rather than a series of discrete devices to provide a certain amount of flexibility to the system. This flexibility is balanced against the performance limitations of the gate array. With reference to FIG. 5, the gate array generates lookup table mode (LUTMODE and LUTMODE) signals, serial enable (SE) signals, a shift clock (SCLK) signal, column address signals (CAS), and a variety of other control signals.

The lookup table control mode (LUTMODE) signal, generated by the gate array, is necessary to provide the frame buffer flexibility necessary to support both true color and multiple pseudocolor images display, and to support region of interest and overlay functions. An 8-bit internal LUTMODE register 60 is established in the gate array to hold the current lookup table mode bits. Twelve output bits are generated from the LUTMODE register; the value of the register is put out continuously on LUTMODE (0 . . . 7), and the inversion of bits 4–7 are placed on NLUTMODE (4 . . . 7).

Figure 6:
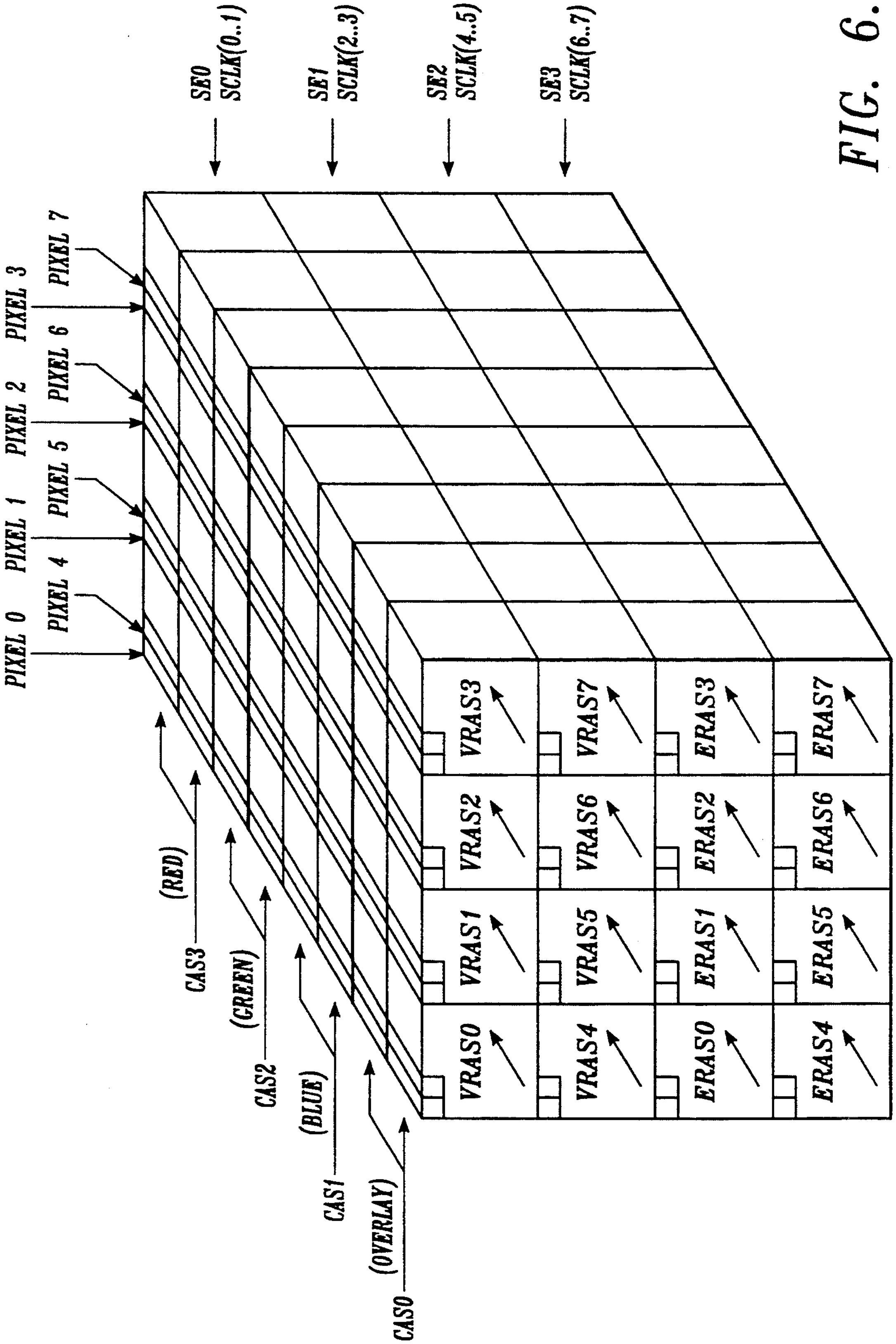
FIG. 6 is a detailed schematic diagram of a video frame buffer memory in accordance with the present invention.

The control signals, SE and SCLK, provided by the gate array, are required by the large size of the video frame buffer and zoom control, respectively. These signals are generated by the serial enable generator 62, and the shift clock state machine 64. With reference to FIG. 6, in one actual embodiment, the video frame buffer is comprised of one hundred and twenty-eight TMS44C251 1-Mbit video RAMs, split into four banks each with a size of 2048×512×32-bits. These video RAMs are available from Texas Instruments. Two of these banks are considered to be the VRAM space (VRAS0–S7), while the other two banks are considered to be the expansion VRAM space or ERAM space (ERAS0–S7). Because the 1-Mbit video RAMs are configured as 512×512×4-bits deep, eight video RAMs are required to provide a 32-bit deep data bus. To provide a bank width of 2048, four sets of eight video RAM chips are used to form the bank. Each of the 512×512×4-bit blocks represents a single video RAM.

The serial enable (SE) and shift clock (SCLK) signals are used to ensure that the proper serial pixel data stream is sent from the video frame buffer to the RAMDACs for display. While shifting all 128 video RAMs at once would ensure the appropriate video RAM shift registers are shifting, the current transients caused by such a simultaneous shift would cause excessive noise problems. To alleviate this problem, only one bank of video RAMs is shifted during each horizontal blanking interval.

The active shifting bank is selected by the serial enable (SE) control signals. While the serial enable signals select which data is being sent to the display via the RAMDACs, shift clocks (SCLK) signals are required for the video RAMs to shift the pixels out to the RAMDACs. Although there are eight shift clock lines for four banks, they are enabled and used by the banks in groups of two (e.g., bank 0 uses shift clocks 0 and 1, which are identically enabled and timed).

Four-way pixel interleaving is also illustrated in FIG. 6, wherein the position of pixels 0–7 are indicated. Because the actual display area is 1280×1024 pixels, the pixel output rate required to refresh the screen is 110 MHz. Since video RAM devices are unable to shift pixels out at this rate, a pixel multiplexing scheme is used to reduce the pixel shift rate out of the video RAM to the RAMDACs. By performing a 4-way pixel multiplex, the shift rate is reduced to 27.5 MHz out of the video RAM, which is an acceptable shift rate. To support this multiplexing, four pixels are presented to the RAMDACs at a rate of 27.5 MHz. The RAMDAC is then responsible for sending the four pixels to the screen at 110 MHz. Pixel multiplexing at a 4:1 ratio is performed automatically in the Brooktree RAMDACs by simply writing an internal control register. This register is written on initialization of the device for proper functionality.

With reference again to FIG. 5, in order to prevent the screen from changing zoom values in the middle of a screen refresh cycle, a zoom buffer 68 is provided for additional control. The zoom register 70 output provides additional input to the shift clock state machine, and causes shift clock pulses to be generated at rates dependent on the zoom register value. For example, a zoom value of three would require a shift clock pulse once every third image load clock, while a zoom of four would require a shift clock once every fourth image load clock. In order to avoid the change of zoom values in the middle of a screen refresh cycle, the zoom buffer is written by the host computer or GSP asynchronously with respect to the screen refresh. During the vertical retrace period, the vertical sync pulse from the GSP causes the zoom value to be transferred from the zoom buffer to the zoom register. The new zoom value is used for the next screen refresh cycle.

In one actual embodiment, a coprocessor status (COPSTAT) register 72 is also included in the gate array. The one interrupt control signal generated by this register is used to synchronize the coprocessor execution with the GSP via interrupt service routines. Each of the interrupts from the coprocessors are latched into the COPSTAT register. Bits 0–3 in the register indicate the status of the coprocessor interrupts for coprocessors 0–3, respectively. If a coprocessor interrupt has occurred on a particular coprocessor, the bit corresponding to that coprocessor is zero (low). Once an interrupt has occurred, the interrupt status bit for that coprocessor remains low until cleared by the writing of a one (high) to the corresponding bit location. Bits 4–7 in the register indicate the status of the coprocessor ready signals (CORDY 0–3). When the status of a coprocessor CORDY is zero, that coprocessor is not available for processing. Thus, the GSP may poll the COPSTAT register to check for coprocessor routine completion or interrupts may be enabled to flag the GSP when a routine has been completed.

The local address and data (LAD) control 76 generates local ready and pagemode control signals. If wait states are needed, the local ready signal is asserted low. For example, if the GSP is attempting to access a coprocessor that is busy, the line is asserted low. Thus, if a coprocessor is busy and its coprocessor ready line is asserted low, the local ready will also be low. Since the GSP is capable of performing pagemode accesses, the pagemode control signal is active during accesses to pagemode access devices (e.g., the dynamic RAM).

Programming of the gate array is performed automatically on power up of the system, for example, by downloading configuration information to the device from a serial programmable read only memory (not shown).

With reference again to FIG. 4, one Mbyte of dynamic RAM (DRAM) 50 is used to store the local program and data needed to control the display, manipulate images and graphics, and control the coprocessors. In one actual embodiment, the memory is made up of eight TMS44C256 1-Mbit DRAM chips organized as 256K×4-bits each, for a total depth of 32-bits. These chips are available from Texas Instruments, Dallas, Tex.

To ensure that the pixel transfers are synchronized between the four RAMDACs, a clock generator 74 is used. In one actual embodiment, the clock generator is a Bt439 chip available from Brooktree Corporation, San Diego, Calif. The clock accepts a phase locked loop output from each RAMDAC, and adjusts the differential clocks to each RAMDAC to minimize the phase difference between the phase locked loop signals. This technique minimizes the output skew between the RAMDACs. The clock also interfaces a 10K ECL oscillator 75 operating at 110 MHz from a single +5 V source to the RAMDACs.

The combination of the coprocessors and the display subsystem, controlled by the GSP and gate array, provide an integrated image processing and graphics system that can efficiently process a number of images and effectively display the results. In such an integrated system, the host includes a library that provides the application programmer with access to the full functionality of the image computing system. Functions included in the library are low level input/output, system management, software management, frame buffer management, display utilities, RAMDAC utilities, and graphics. While some of the library functions can be implemented by writing directly to the GSP input/output registers or memory from the host, the more sophisticated operations require the support of software executed on the GSP, possibly with support from the coprocessors.

Examples of specific applications of the image computing system 30 in a host computer environment follow. Generally, the image computing system acts as a slave device to a host central processing unit (CPU). The host is responsible for receiving user input, initializing and downloading programs and data (images), and sending processing commands to the image computing system. Data and commands are sent to the image computing system by the host via data and command buffers in the host interface. These particular examples describe a system in which the image computing system is integrated into a host such as the NeXT computer; the image computing system appears as a physical device in such a host system. It is to be understood that the image computing system can be integrated into other host systems.

Figure 7:
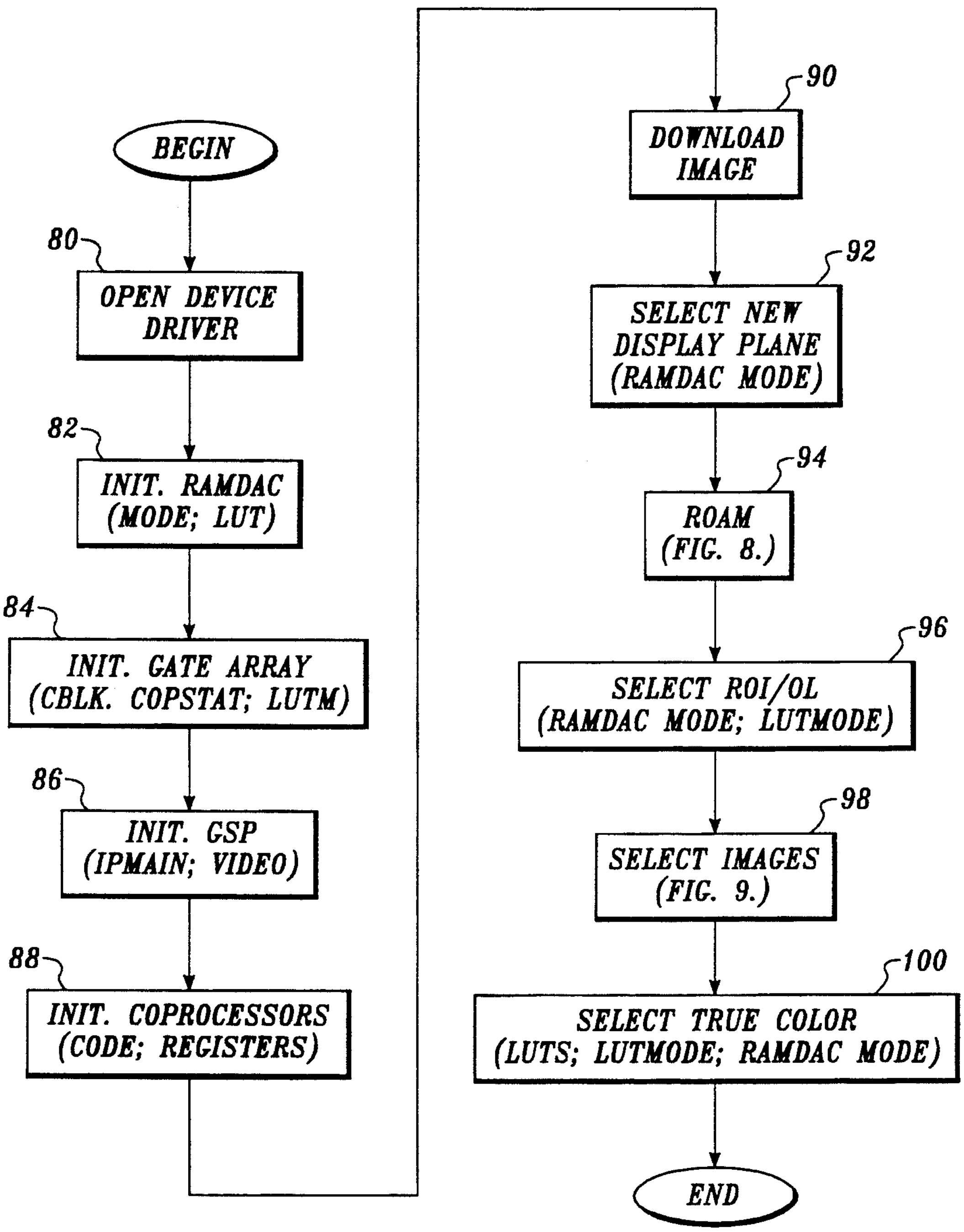
FIG. 7 is a flow diagram of an example of a graphics display session controlled by a system including the present invention.

With reference to FIG. 7, when the image computing system is configured as a physical device in the host, the image computing system must be opened before it can be accessed. At block 80, the required device driver is opened and the base logical address of the system is stored. The base address is normally hidden from the application programmer and is used only by the low-level input/output routines.

Prior to use, the image computing system components are initialized. The RAMDACs, gate array, GSP, and coprocessor are each initialized. The video RAM is automatically initialized at power up.

At block 82, the RAMDAC mode and lookup tables are all initialized. With respect to the modes, in one actual embodiment, the RAMDACs are initially set for the mode Selection 2, illustrated in FIG. 3; the color RAMDACs are placed in X-Windows mode and the overlay RAMDAC is placed in Normal mode. With respect to the lookup table initialization, the tables are loaded from a 256-entry host side buffer. In this example, pseudocolor tables are loaded.

At block 84, the gate array is initialized by initializing the combined blank delay, the coprocessor status register, the zoom-register, and the LUTMODE register. The combined blank delay (CBLK) is set to a predetermined delay interval for coordinating the RAMDAC and video RAM timing. The coprocessor status registers are cleared. The zoom register is initialized to a value of zero which represents a zoom of one. The LUTMODE register is initialized to reflect the initial display selection; in this example, the LUTMODE register is set to F0

At block 86, the GSP is initialized by downloading the main program, referred to as IPMAIN, and initializing the video timing and control registers. The initialization of the video timing and control registers includes selecting the portion of the video RAM that will be enabled to the screen. In one actual embodiment, the information from the upper left portion of the frame buffer is selected for the initial display.

At block 88, the coprocessors are initialized. The code for a selected process, such as the Fast Fourier Transform (FFT), is downloaded into the coprocessor memory.

All of the initialization steps 82–88 are performed by the host processor. After these steps are performed, the IPMAIN program on the GSP is started. The program loops continuously as long as the image computing system is active. While not processing any other commands, the IPMAIN command decoder continuously monitors the host command buffer for a valid command. When a valid command is received, IPMAIN decodes the command and executes the appropriate function, using parameters and data from the communication buffers as required. After the function returns, IPMAIN clears the command from the host command buffer. This signals to the host that the command has completed execution and that IPMAIN is ready for the next command. Generally, the host does not need to continuously monitor the host command buffer to check for command completion. The host is free to execute other tasks as long as it checks the host command buffer before sending a command.

One example, described in conjunction with blocks 90–100, illustrates the use of the multiple RAMDAC display configuration. A series of images from a CT study are loaded into the RAMDACs and displayed using different display modes.

At block 90, a series of 8-bit images are downloaded into the video RAM. One of the main functions of the image computing system is the loading of an image from the host. The image loading function loads the data from a host image file to the video frame buffer. The function can handle 8-bit, 16-bit, 24-bit, and 32-bit images of any dimension up to the frame buffer size of 2048×2048 bytes. The frame buffer coordinate system for the destination coordinates is specified by using one of three coordinate systems. References to pixel positions in the frame buffer may be made relative to ABSOLUTE, WINDOW and RELATIVE coordinate systems. The ABSOLUTE coordinate system has a fixed origin (0,0) located at the upper left corner of the video display window. The WINDOW coordinate system's origin is fixed relative to the display window and is located at the upper left corner of the display window. As the display is panned within the frame buffer, the origin of the WINDOW coordinate system shifts with it. The RELATIVE coordinate system's origin in similar to the WINDOW coordinate system's origin in that its placement within the video frame buffer is arbitrary. However, whereas the WINDOW origin is implicitly defined by the display window, the RELATIVE origin is explicitly defined by the programmer.

During image loading, the destination frame buffer is specified by using one of the flags: RED (8-bit, red buffer); GREEN (8 bit, green buffer); BLUE (8 bit, blue buffer); OVLY (8 bit, overlay buffer); BIT16 (16 bit, OVLY/BLUE buffer); or BIT32 (32 bit, all buffers). In the example, sixteen 512×512 CT images are loaded into each 8-bit frame buffer.

As noted above, during initialization, the LUTMODE register was set for selection of one of four image planes. The overlay frame buffer image was initialized for display (set Normal) at block 82. Thus, the initial display is of the image in the upper left corner of the overlay frame buffer. At block 92, the red frame buffer is selected by the operator for display. The red RAMDAC is enabled by placing the red RAMDAC in Normal mode and placing the overlay RAMDAC in X-Windows mode. At block 94, any image in the red frame buffer can be viewed by using a roaming function.

Figure 8:
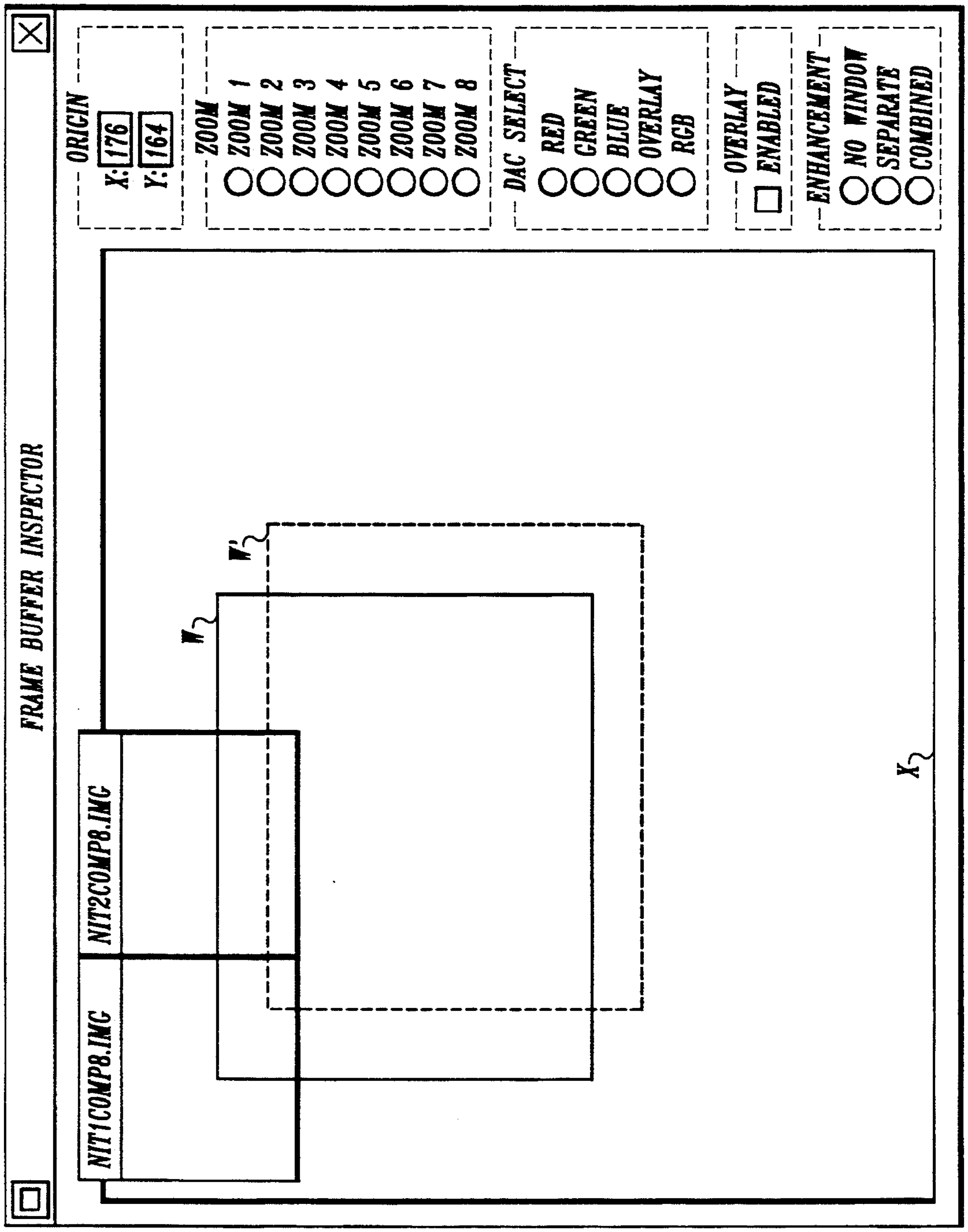
FIG. 8 is a pictorial representation of a graphical user interface for controlling a roaming display procedure.

With reference to FIG. 8, an example of a host user interface for carrying out the roaming capability of the image computing system includes a windowed display W depicting the visual portion on the actual video monitor. The area X represents the entire 2K×2K×32-bit video frame buffer. The example has two images loaded in the upper left corner of the frame buffer. Using a mouse, or other window control device, on the host system, the operator can reposition the window W within the display, e.g., to window W' (shown in reference). The repositioning of the display window W is converted by the image computing system into a register entry in the GSP that indicates where output from the video RAM originates. The data held in the portion of the video frame buffer corresponding to window' is displayed.

At block 96, an operator sets the display mode to region of interest with overlay, Selection 5 from FIG. 3. The selection causes a rewriting of the LUTMODE register and all RAMDACs are placed in the Normal mode. At block 98, the operator selects which regions of which frame buffers will be displayed on the video monitor and any overlay that will be displayed.

Figure 9:
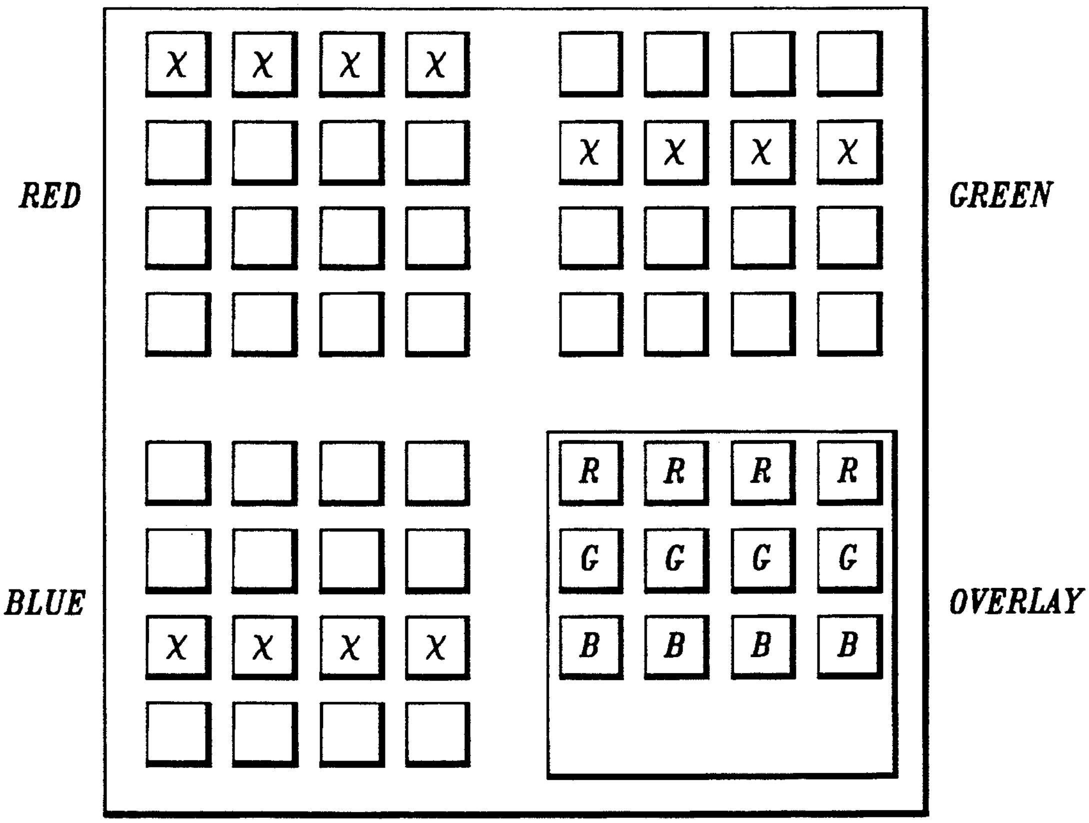
FIG. 9 is a pictorial representation of a graphical user interface for controlling a region of interest and overlay display procedure.

With reference to FIG. 9, a sample host operator interface for region of interest selection includes a display segmented into representations of the three frame buffers that are currently available for display. Each segment includes a miniaturized depiction of the image(s) stored in that frame buffer. The operator can select a variety of non-overlapping images from each frame buffer to be displayed by the image computing system. For example, if the user selects the miniaturized images indicated by an X, the selections are converted by software into a series of region of interest selections—the logic nibbles in the overlay plane are set appropriately so that the ROI/OL logic output enables the appropriate RAMDACs to output display to the screen. In the fourth segment of the host display, the selected regions can be displayed (e.g., a miniaturized version of the image computing system display). The fourth region allows the user to position and enter overlay text and/or graphics that is to be displayed on the main display.

The operator could continue to select different display modes; for each mode, the LUTMODE register, RAMDAC modes, and LUT content are modified as necessary. For example, the operator selects true color mode at block 100, the LUTs are then reloaded with true color tables.

A second example illustrates the use of the image computing system's image processing capabilities. In the image computing system, a number of algorithms can be implemented which exploit the parallel architecture of the coprocessor subsystem. The algorithms utilize the coprocessor subsystem in a single instruction multiple data (SIMD) mode. In one actual embodiment, while the coprocessors are each executing a copy of the same program, each coprocessor will generally be executing in a different part of the program at any given time. For this reason, it may be more precise to coin the term single program multiple data (SPMD) or pseudo-SIMD mode for these procedures. The example describes the execution of a Fast Fourier Transform on an image stored in the video RAM. For this particular procedure to be executed, the Fast Fourier Transform control software is downloaded during the initialization of the coprocessors described above. The FFT and IFFT have been implemented using the row and column method. Each of the four FPPs is given an entire row or column to process, thereby parallelizing the operation. The actual performance for a 512×512×32-bit image using all four FPPs is less than 3 seconds for either an FFT or an IFFT.

The finite discrete Fourier transform is a mathematical transformation from one domain to another. It is defined by the following expression:

$$X(k) = \begin{cases} \sum_{n=0}^{N-1} x(n)\, W_N^{kn} & 0 \leqq k \leqq N-1 \\ 0 & \text{otherwise} \end{cases} \tag{1}$$

Where x(n) is a finite sequence, X(k) is the transformed sequenced, N is the number of samples in the sequence and $W_N = e - j(2\pi/N)$. The inverse transform is similarly defined as:

$$x(n) = \begin{cases} \frac{1}{N} \sum_{k=0}^{N-1} X(k)\, W_N^{-kn} & 0 \leqq n \leqq N-1 \\ 0 & \text{otherwise} \end{cases} \tag{2}$$

Taken collectively, Equations (1) and (2) constitute the finite Discrete Fourier Transform (DFT) pair. The transform pair is useful in image processing to transform an image from the spatial domain to the frequency domain and then back again. The Discrete Fourier Transform (DFT) and its Inverse (IDFT) in two dimension is:

$$X(k,l) = \begin{cases} \sum_{m=0}^{M-1} \sum_{n=0}^{N-1} x(m,n)\, W_M^{km}\, W_N^{ln} & \begin{array}{l} 0 \leqq k \leqq M-1 \\ 0 \leqq l \leqq N-1 \end{array} \\ 0 & \text{otherwise} \end{cases} \tag{3}$$

$$x(m,n) = \tag{4}$$

$$\begin{cases} \frac{1}{MN} \sum_{k=0}^{M-1} \sum_{1=0}^{N-1} X(k,1)\, W_M^{-km}\, W_N^{-1n} & \begin{array}{l} 0 \leqq m \leqq M-1 \\ 0 \leqq n \leqq N-1 \end{array} \\ 0 & \text{otherwise} \end{cases}$$

where M is the vertical or column dimension and N is the horizontal or row dimension of the image.

These may be rewritten as:

$$X(k,l) = \begin{cases} \sum_{n=0}^{N-1} G(k,n)\, W_N^{ln} & \begin{array}{l} 0 \leqq k \leqq M-1 \\ 0 \leqq 1 \leqq N-1 \end{array} \\ 0 & \text{otherwise} \end{cases} \tag{5}$$

where $$G(k,n) = \begin{cases} \sum_{m=0}^{M-1} x(m,n)\, W_M^{km} & \begin{array}{l} 0 \leqq k \leqq M-1 \\ 0 \leqq n \leqq N-1 \end{array} \\ 0 & \text{otherwise} \end{cases} \tag{6}$$

and $$x(m,n) = \begin{cases} \frac{1}{N} \sum_{1=0}^{N-1} x(m,l)\, W_N^{-ln} & \begin{array}{l} 0 \leqq m \leqq M-1 \\ 0 \leqq n \leqq N-1 \end{array} \\ 0 & \text{otherwise} \end{cases} \tag{7}$$

$$x(m,l) = \begin{cases} \frac{1}{M} \sum_{k=0}^{M-1} X(k,l)\, W_M^{-km} & \begin{array}{l} 0 \leqq m \leqq M-1 \\ 0 \leqq 1 \leqq N-1 \end{array} \\ 0 & \text{otherwise} \end{cases} \tag{8}$$

The significance of this expression is that it demonstrates that the 2-D DFT may be decomposed into a sequence of 1-D DFTs. By comparing Equations (5) and (6) to Equation (1), it can be shown that G(k,n) corresponds to the set of 1-D DFTs of the columns of the image x(m,n) and that X(k,l) corresponds to the set of 1-D DFTs of the rows of G(k,n). A similar analysis for Equations (7) and (8) and Equation (2) will yield a corresponding method for the computation of the 2-D IDFT. The well-known Fast Fourier Transform algorithm is an efficient means of computing the 1-D DFTs and IDFTs.

The FFT algorithm implemented in this example is based on the Cooley-Tukey radix-2 decimation-in-frequency algorithm discussed in detail in "DFT/FFT and Convolution Algorithms" C. S. Burns and T. W. Parks, New York, N.Y. (John Wiley & Sons 1985). The IFFT routine is nearly identical to the FFT routine except that it scales the results by 1/N at the end.

Figure 10:
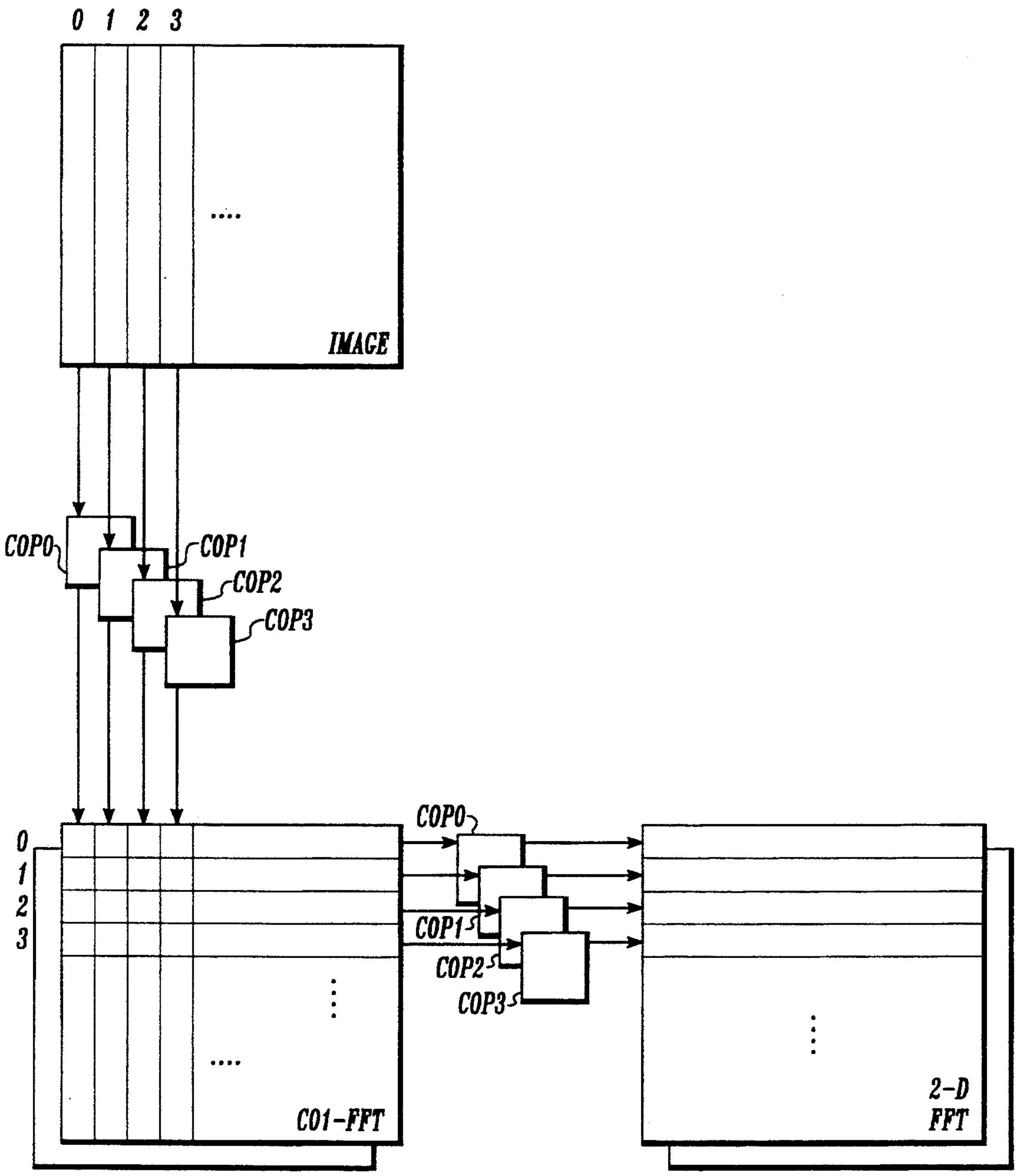
FIG. 10 is a schematic diagram of the partitioning of image data for a Fast Fourier Transform performed in accordance with the present invention.

As shown in FIG. 10, a coprocessor scheduler (a library routine) parallelizes the FFT by interleaving the columns/rows processed across the four coprocessors. Column 0 is processed by COP0, column 1 is processed by COP1, column 2 is processed by COP2 and column 3 is processed by COP3. As each coprocessor finishes, it is sequentially assigned the next column. Once each of the columns is processed, the rows are processed in a similar fashion. In general, column/row x is assigned to COP (x modulus 4). While the routine is executing, the scheduler controls the synchronization of the coprocessors. In addition to the FFT and IFFT, the FFT coprocessor program might support calculation of the power spectrum and frequency mask multiplication. In use, an image may be displayed by the image computing system, e.g., in the upper left one-fourth of the video monitor. When an operator requests that the FFT be performed, the image data is transferred to the coprocessors and the FFT carried out. The transformed image is then sent to the video frame buffer, in the same frame as the original image but in a different portion of the frame. The image might be stored and displayed in the lower one-half of the monitor. An IFFT is then performed against the transformed image; the image data is transferred to the coprocessors, processed, and transferred back to the video frame buffer. The resultant image is stored and displayed so that it is adjacent the original image, e.g., in the upper right one-fourth of the monitor. In this manner the operator can view the original image and the transformed images simultaneously.

An example of graphics processing using the coprocessors is the generation of a 3-dimensional model. Generally, a 3-dimensional model is generated from a display list of information. The display list includes information related to a set of polygons; the information includes vertice identification and a depth measurement. The display list is generated by a user as the user draws the polygons that make up the model. The display list is used during the rendering of the model, i.e., the drawing of the model, from the display list. Rendering requires a determination of where each polygon appears in 3-dimensions, what color the polygon should be, any shading within or across the polygon, etc.

Using the image computing system of the present invention, the rendering of the model is performed in an efficient manner. As the system is initialized, the rendering pipeline software is downloaded into the coprocessors' memory devices. Additionally, GSP software and a display list are downloaded to the system's dynamic RAM. In response to a user command that identifies a model to be rendered, display list information is sent to each coprocessor. To take advantage of the parallel processing capabilities of the system, one polygon is sent to one coprocessor, one to another coprocessor, etc. Thus, each coprocessor processes a single polygon. The resultant image data is sent to the video RAM for storage and subsequent display. The coprocessors determine, for each polygon, whether a particular pixel from a polygon is to be output based on the depth of the polygon in the model (hidden surface removal). Additionally, the coprocessors determine the color of the polygon and perform any shading requirements.

In one actual embodiment, the coprocessors utilize a Z-buffering technique to perform hidden surface removal, a Phong lighting model to calculate the coloration of the polygon vertices, and a Gouraud shading technique for smooth shading between the vertices. The Z-buffer data related to the depth of a point in the image is held in the video frame buffer along with the image that is being generated. The GSP controls all communication between the coprocessors and the other components.

In operation, the GSP provides polygon information from the display list to a coprocessor. The coprocessor analyzes each horizontal line in its polygon and determines where that line appears in the model and whether the line is visible based on the distance of the line from the viewer. The coprocessor requests information from the partially rendered image and from the Z-buffer data that is related to a particular line in the polygon. The GSP provides this information from the frame buffer in the form of scan lines; scan lines are horizontal lines in an image. One partially rendered image scan line and one Z-buffer scan line at a time are passed to the coprocessor. The coprocessor processes the information and transmits a new partial image scan line including the new picture data and a new Z-buffer scan line with data corresponding to the new picture data. The information is transmitted to the video frame buffer under the control of the GSP. Each polygon in the display list is processed in this manner. The result is a complete image stored in the video frame buffer.

Using such a graphics processing system, the host system can support the generation of the display list by the user by providing graphics drawing applications. The model rendering process, which requires a great deal of computing power and graphics capabilities, is then removed from the host and carried out by the image computing system.

While preferred embodiments of the invention have been illustrated and described, it will be appreciated that various changes can be made therein without departing from the spirit and scope of the invention.

Although the present description focuses on the generation of color images using an RGB model, other color models (such as YUV, CMY, HSV and YIQ) can be supported on the system either directly or by conversion to RGB color signals. Generally, all color models describe color in terms of three components. For example, the YUV model uses the component set {luminance, hue, saturation}. Thus, the present system can be used in a YUV model system assuming that a YUV monitor is available. In such a system, the RAMDACs' lookup tables are loaded with the appropriate information. Alternatively, as noted above, YUV image data can be transformed into RGB data using an appropriate matrix and displayed on an RGB video display device.

The display subsystem may be used in an alternative environment wherein each RAMDAC output, drives a separate video display. Thus, up to four separate displays could be driven by the system illustrated in FIG. 1. The output from each RAMDAC would be a gray level signal. One signal can drive a gray level display, e.g., the output is used as equivalent red, green and blue level inputs.

The embodiments of the invention in which an exclusive property or privilege is claimed are defined as follows:

1. A computing system for generating image signals for driving a color video display device, each image comprising pixels, wherein the pixels are generated from a set of a plurality of separate signals representing different pixel color characteristics, the system comprising:

(a) a video buffer for storing image data representing one or more images in a plurality of image planes;

(b) mode selection means for selecting a display mode from a first display mode and a second display mode; and (c) image conversion means for producing pixel color characteristic signals from said image data, said image conversion means including:

(i) a plurality of display generating means, each operable in a plurality of operating modes, for converting image data into signals representing the different pixel color characteristics, such that each of said display generating means converts image data from one of said image planes and is capable of generating pixel color characteristic signals; and (ii) display logic means for selecting, for a pixel, a set of a plurality of separate pixel color characteristic signals from said display generating means in accordance with said display mode selection, such that:

in said first mode, said set of a plurality of separate pixel color characteristic signals is comprised of a combination of signals representing the different pixel color characteristics which signals are selected from at least two of said display generating means, and in said second mode, said set of a plurality of separate pixel color characteristic signals is selected from a single display generating means, whereby said set of a plurality separate pixel color characteristic signals is output to a video display device which displays said pixel.

2. A computing system as claimed in claim 1, wherein said set of pixel color characteristic signals is a set of three signals representing three different color characteristics.

3. A computing system as claimed in claim 1, wherein each of said display generating means includes a lookup table including pixel color characteristic output entries that are addressed by said image data, such that said image data is converted into the pixel color characteristic signal output entry stored at the table address associated with said image data.

4. A computing system as claimed in claim 3, wherein said set of pixel color characteristic signals is a set of three signals representing three different color characteristics and said pixel color characteristic output entries include color subentries related to said three signals.

5. A computing system as claimed in claim 4, wherein in said first display mode, first, second and third display generating means correspond to said three signals, said image data represents a single image comprised of three color components stored in three separate image planes and, for each display generating means, said lookup table includes a color subentry for said color corresponding to said display generating means and null subentries for said other colors, such that each display generating means converts the color component for the color to which the display generating means corresponds into a color signal.

6. A computing system as claimed in claim 4, wherein in said second display mode, said video buffer stores image data representing an independent image in each of said image planes, each display generating means lookup table includes color subentries for each of the three signals, and each of said display generating means converts image data for an independent image into said three color signals.

7. A computing system as claimed in claim 3, wherein said image conversion means further includes a digital to analog converter for converting said pixel color characteristic output entries into pixel color characteristic analog signals.

8. A computing system as claimed in claim 1, wherein in said second mode said mode selection means further includes region of interest means for selecting an image plane for each pixel, such that said display logic means selects said set of pixel color characteristic signals for each pixel in response to said image plane selection.

9. A computing system as claimed in claim 1, wherein:

said mode selection means further provides means for selecting an overlay mode in conjunction with selection of said first or second display mode;

said video buffer stores overlay data representing an overlay image, said overlay data including control information for each pixel; and in said overlay mode, said display logic means selects said set of pixel color characteristic signals for each pixel in accordance with said overlay data control information.

10. A computing system as claimed in claim 1, further including a plurality of image coprocessors in communication with said video buffer, each coprocessor including a processor and memory, whereby said image data can be passed between said video buffer and said image coprocessors for purposes of transforming said image data in a predetermined manner.

11. A computing system as claimed in claim 1, wherein said system further includes:

(a) a host system interface for communicating with a host system; and (b) a graphics system processor including a central processor and memory, said graphics system processor including control program means for controlling the communication between the host system and the image computing system via said host system interface, whereby image data is transferred from the host to said video buffer and display selections are transferred from the host to said mode selection means.

12. A computing system as claimed in claim 11, wherein each of said display generating means includes a lookup table including pixel characteristic entries that are addressed by said image data, such that said image data is converted into said pixel characteristic signal entry stored at the table address associated with said image data, and wherein said lookup table entries are transferred from the host to said display generating means via said graphics system processor and said host system interface.

13. A method for generating signals for driving a color video display device, each image comprising pixels, wherein the pixels are generated from a plurality of signals representing different pixel color characteristics, the method comprising the steps of:

(a) receiving image data representing one or more images;

(b) storing said image data in a plurality of image planes;

(c) selecting a display mode from a first display mode and a second display mode; and (d) producing pixel color characteristic signals from said image data, by:

(i) converting said image data into pixel color characteristic signals using a plurality of display generating means each having a plurality of operating modes, such that each of said display generating means converts said image data from one of said image planes and is capable of generating pixel color characteristic signals; and (ii) selecting a set of a plurality of separate signals representing the different color characteristics for a pixel from said display generating means in accordance with said display mode selection, such that:

in said first mode, said set of a plurality of separate pixel color characteristic signals is comprised of a combination of signals representing the different color characteristics which signals are selected from at least two of said display generating means, and in said second mode, said set of a plurality of separate pixel color characteristic signals are selected from a single display generating means, whereby said set of a plurality of separate pixel color characteristic signals is output to a color video display device.

14. A method as claimed in claim 13, wherein in said second mode, each of said display generating means converts image data for an independent image plane, the method further including, in said second mode, the step of selecting one of said independent image planes for each pixel, and, in response to said selection, selecting a set of pixel color characteristic signals for a particular pixel from the display generating means which converted said independent image plane selected for said pixel.

15. A method as claimed in claim 13, wherein, in said first mode, each of said display generating means converts related image data for a single image, said related image data being stored in a plurality of said image planes.

16. A computing system for generating image signals for driving a color video display device, each image comprising pixels, wherein the pixels are generated from a plurality of signals representing different pixel color characteristics, the system comprising:

(a) a video buffer for storing image data representing one or more images in a plurality of image planes;

(b) mode selection means for selecting a display mode from a first display mode and a second display mode, and (c) a plurality of display generating means, each including lookup table means for converting image data from one of said image planes into pixel color characteristic data, digital to analog converting means for converting said pixel color characteristic data into pixel color characteristic signals, and multiple channel output means for transmitting said pixel color characteristic signals, and each operating in a plurality of operating modes; and (d) display logic means for selecting, for a pixel, a set of pixel color characteristic signals from said display generating means in accordance with said display mode selection, such that in said first mode, said set of a plurality of pixel color characteristic signals is comprised of a combination of signals representing different pixel color characteristics which signals are selected from at least two of said display generating means, and in said second mode, said set of a plurality of pixel color characteristic signals are selected from a single display generating means, whereby said set of pixel characteristic signals is output to a video display device.

17. A computing system as claimed in claim 16, wherein said mode selection means further determines said operating mode for each of said display generating means.

18. A computing system as claimed in claim 16, wherein said multiple channel output means include a set of wires, such that different pixel color characteristic signal types are transmitted on each wire, and wherein wires from each of said display generating means that transmits the same pixel color characteristic signal type are connected by a logical OR connection.

19. A computing system as claimed in claim 16, wherein each of said display generating means includes a lookup table including pixel color characteristic output entries that are addressed by said image data, such that said image data is converted into the pixel color characteristic signal output entry stored at the table address associated with said image data.

20. A computing system as claimed in claim 19, wherein said set of pixel color characteristic signals is a set of three color signals and said pixel color characteristic output entries include color subentries related to said three color signals.

21. A computing system as claimed in claim 20, wherein in said first display mode, first, second and third display generating means correspond to said three color signals, said image data represents a single image comprised of three color components stored in three separate image planes, and, for each display generating means, said lookup table includes a color subentry for said color corresponding to said display generating means and null subentries for said other colors, such that each display generating means converts the color component for the color to which the display generating means corresponds into a color signal.

22. A computing system as claimed in claim 20, wherein in said second display mode, said video buffer stores image data representing an independent image in each of said image planes, each display generating means lookup table includes color subentries for each color signal and each of said display generating means converts image data for an independent image into said three color signals.

23. A computing system as claimed in claim 16, further including a plurality of image coprocessors in communication with said video buffer, each coprocessor including a processor and memory, whereby said image data can be passed between said video buffer and said image coprocessors for purposes of transforming said image data in a predetermined manner.

24. A computing system as claimed in claim 16, wherein said system further includes:

(a) a host system interface for communicating with a host system; and (b) a graphics system processor including a central processor and memory, said graphics system processor including control program means for controlling the communication between the host system and the image computing system via said host system interface, whereby image data is transferred from the host to said video buffer and display selections are transferred from the host to said mode-selection means.

25. A computing system for driving a color video display device having input means for receiving at least three separate color characteristic input signals including a red input signal, a green input signal and a blue input signal, said color video display device having means for generating an image based on the received color characteristic signals, said computing system comprising at least three RAMDACs including a first RAMDAC, a second RAMDAC and a third RAMDAC, each of said three RAMDACs being operable to generate at least three separate color characteristic output signals including a red output signal, a green output signal and a blue output signal for coupling to the input means of the video display device, means for controlling operation of said three RAMDACs in a plurality of different modes including a true color mode in which the red output signal of said first RAMDAC is a variable signal, the green and blue output signals of said first RAMDAC each being a nonvarying null signal, the green output signal of said second RAMDAC is a variable signal, the red and blue output signals of said second RAMDAC each being a nonvarying null signal, and the blue output signal of said third RAMDAC is a variable signal, the red and green output signals of said third RAMDAC each being a nonvarying null signal, whereby in said true color mode the red output signal from said first RAMDAC, the green output signal from said second RAMDAC and the blue output signal from said third RAMDAC are coupled to the input means of the video display device for use in generating an image, said controlling means including means for optionally controlling said three RAMDACs to operate in a pseudocolor mode in which a single one of said three RAMDACs generates variable red, green and blue output signals while all three of the output signal of each of the other two of said three RAMDACs is a nonvarying null signal, whereby in said pseudocolor mode the variable red, green and blue output signals from said single one of said three RAMDACs are coupled to the input means of the video display device for use in generating an image.

26. A computing system for driving a color video display device having input means for receiving at least three separate color characteristic input signals including a first input signal representing a first color characteristic, a second input signal representing a second color characteristic different from the first color characteristic and a third input signal representing a third color characteristic different from the first and second color characteristics, said color video display device having means for generating an image based on the received color characteristic signals, said computing system comprising at least three signal generating means for generating color characteristic signals including a first signal generating means, a second signal generating means and a third signal generating means, each of said three signal generating means being operable to generate at least three separate color characteristic output signals representing the first, second and third color characteristics, respectively, for coupling to the input means of the video display device, means for controlling operation of said three signal generating means in a plurality of different modes including a first mode in which the output signal of said first signal generating means representing the first color characteristic is a variable signal and the other color characteristic output signals of said first signal generating means are nonvarying null signals, the output signal of said second signal generating means representing the second color characteristic is a variable signal and the other color characteristic output signals of said second signal generating means are nonvarying null signals, and the output signal of said third signal generating means representing the third color characteristic is a variable signal and the other color characteristic output signals of said third signal generating means are nonvarying null signals, whereby in said first mode the variable output signals from said first, second and third signal generating means are coupled to the input means of the video display device for use in generating an image, said controlling means including means for optionally controlling said three signal generating means to operate in a second mode in which a single one of said three signal generating means generates three variable output color characteristic signals while all three of the output signals of each of the other two of said signal generating means is a nonvarying null signal, whereby in said second mode the variable output signals from said single one of said three signal generating means are coupled to the input means of the video display device for use in generating an image.

27. A computing system for driving a color video display device having input means for receiving at least three separate color characteristic input signals including a first input signal representing a first color characteristic, a second input signal representing a second color characteristic different from the first color characteristic and a third input signal representing a third color characteristic different from the first and second color characteristics, said color video display device having means for generating an image based on the received color characteristic signals, said computing system comprising at least three signal generating means for generating color characteristic signals including a first signal generating means, a second signal generating means and a third signal generating means, each of said three signal generating means being operable to generate at least three separate color characteristic output signals representing the first, second and third color characteristics, respectively, for coupling to the input means of the video display device, means for controlling operation of said three signal generating means in a plurality of different modes including a first mode in which the output signal of said first signal generating means representing the first color characteristic, the output signal of said second signal generating means representing the second color characteristic and the output signal of said third signal generating means representing the third color characteristic are coupled to the input means of the video display device for use in generating an image without reference to the other output signals of said signal generating means, said controlling means including means for optionally controlling said three signal generating means to operate in a second mode in which the three output signals of a single one of said signal generating means representing the three color characteristics are coupled to the input means of the video display device for use in generating an image without reference to the output signals of the other two of said signal generating means.

* * * * *

UNITED STATES PATENT AND TRADEMARK OFFICE

CERTIFICATE OF CORRECTION

PATENT NO. : 5,355,443

DATED : October 11, 1994

INVENTOR(S) : Y. Kim et al.

It is certified that error appears in the above-indentified patent and that said Letters Patent is hereby corrected as shown below:

Title page, item

| [75] | Inventors | "Gillman K. Wong" should read --Gilman K. Wong-- |
|---|---|---|
| **Column** | **Line** | |
| 1 | 41 | "with synthesis of" should read --with the synthesis of-- |
| 2 | 24 | "true color" should read --*true color*-- |
| 2 | 24 & 25 | "true color" should read --*true color*-- |
| 2 | 26 & 27 | "colo-r" should read --color-- |
| 6 | 43 | "invention on includes"" should read --invention includes-- |
| 8 | TABLE 1 | "Input" should appear one line up next to "Output" |
| 9 | 46 | "*is output into the color RAMDACs and*" should read --is output into the color RAMDACs and-- |
| 9 | 50 | "16*b-d*)" should read --16(b-d)-- |
| 10 | 27 | "red only" should read --*red only*-- |
| 10 | 27 | "any" should read --*any*-- |

UNITED STATES PATENT AND TRADEMARK OFFICE

CERTIFICATE OF CORRECTION

PATENT NO. : 5,355,443

DATED : October 11, 1994

INVENTOR(S) : Y. Kim et al.

It is certified that error appears in the above-indentified patent and that said Letters Patent is hereby corrected as shown below:

| COLUMN | LINE | |
|---|---|---|
| 12 | 46 | "dacsel" should read --*dacsel*-- |
| 13 | 26 | "peak)processor," should read --peak) processor,-- |
| 13 | 44 | "NEXT" should read --NeXT-- |
| 13 | 60 | "NEXT" should read --NeXT-- |
| 13 | 61 | "Vols. 1,2, and 3" should read --Vols. 1, 2, and 3-- |
| 17 | 11 | "F0" should read --*F0*.-- |
| 18 | 38 | "window'" should read --window *W*'-- |
| 18 | 57 & 58 | "selection-s" should read --selections-- |
| 23 | 10 | "plurality separate" should read --plurality of separate-- |
| 25 | 28 | "mode, and" should read --mode; and-- |

UNITED STATES PATENT AND TRADEMARK OFFICE

CERTIFICATE OF CORRECTION

PATENT NO. : 5,355,443

DATED : October 11, 1994

INVENTOR(S) : Y. Kim et al.

It is certified that error appears in the above-indentified patent and that said Letters Patent is hereby corrected as shown below:

Column 26, lines 46 & 47 "mode-selection" should read --mode selection--

Signed and Sealed this

Eighteenth Day of July, 1995

Attest:

BRUCE LEHMAN

*Attesting Officer* *Commissioner of Patents and Trademarks*